US007480702B2

(12) United States Patent
Cohn et al.

(10) Patent No.: US 7,480,702 B2
(45) Date of Patent: Jan. 20, 2009

(54) STORAGE CONFIGURATION LOADER

(75) Inventors: Jeremy Andrew Cohn, Tucson, AZ (US); Andrew Paul Gellai, Tucson, AZ (US); Paul Anthony Jennas, II, Tucson, AZ (US); Bryan John Wright, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 10/983,360

(22) Filed: Nov. 8, 2004

(65) Prior Publication Data

US 2006/0112173 A1    May 25, 2006

(51) Int. Cl.
G06F 15/177    (2006.01)
G06F 15/173    (2006.01)
(52) U.S. Cl. .................. 709/220; 709/222; 709/223
(58) Field of Classification Search ............... 709/217, 709/218, 220, 223, 224, 222
See application file for complete search history.

(56) References Cited

U.S. PATENT DOCUMENTS

| 5,970,030 | A | 10/1999 | Dimitri et al. ............ 369/36 |
| 6,195,750 | B1 | 2/2001 | Ellsworth ................ 713/100 |
| 6,269,423 | B1 | 7/2001 | Kishi ..................... 711/113 |
| 6,349,274 | B1 | 2/2002 | Kay et al. ................ 703/133 |
| 6,510,500 | B2 | 1/2003 | Sarkar .................... 711/162 |
| 6,640,291 | B2 | 10/2003 | Fujibayashi et al. ....... 711/162 |
| 6,665,714 | B1 * | 12/2003 | Blumenau et al. ......... 709/222 |
| 6,892,264 | B2 * | 5/2005 | Lamb .................... 710/301 |
| 7,275,103 | B1 * | 9/2007 | Thrasher et al. ........... 709/224 |
| 2003/0236884 | A1 | 12/2003 | Yamamoto et al. ........ 709/225 |

* cited by examiner

Primary Examiner—Ario Etienne
Assistant Examiner—Hussein Elchanti
(74) Attorney, Agent, or Firm—Dale F. Regelman; Quarles & Brady LLP

(57) ABSTRACT

Disclosed are a system, a method, and article of manufacture to configure information storage and retrieval systems. A configuration loader receives configuration commands from a configuration loader user interface. Upon receipt of configuration commands, the configuration loader transfers storage controller configurations from information storage and retrieval system configuration sources to target information storage and retrieval systems. Threading technology is used to apply a thread manager for managing threads to accomplish the configuration transfers. Multiple physical and/or logical configurations may be transferred simultaneously using the threading technology.

45 Claims, 8 Drawing Sheets

600 — APPLYING A CONFIGUARATION

STORAGE CONFIGURATION LOADER

CROSS-REFERENCES TO RELATED APPLICATIONS

The present application is related to application Ser. No. 10/984,432, entitled "Storage Configuration Loader: verification algorithms", application Ser. No. 10/983,444, entitled "Storage Configuration Loader Using Cache For Fast Retrieval Of Storage Configurations", and application Ser. No. 10/983,852, entitled "Storage Configuration Loader With Automatic Error Recovery", all filed on an even date herewith, the disclosures of which are hereby incorporated by reference in their entirety.

TECHNICAL FIELD

This invention relates to an apparatus and method to configure information storage and retrieval systems.

BACKGROUND OF THE INVENTION

Data storage and retrieval systems are used to store information provided by one or more host computer systems. Such data storage and retrieval systems receive requests to write information to one or more secondary storage devices, and requests to retrieve information from those one or more secondary storage devices. Upon receipt of a write request, the system stores information received from a host computer in a data cache. In certain implementations, a copy of that information is also stored in a nonvolatile storage device. Upon receipt of a read request, the system recalls information from the one or more secondary storage devices and moves that information to the data cache. Thus, the system is continuously moving information to and from storage devices, and to and from the data cache.

In certain data processing applications, data is copied to multiple individual information storage and retrievals systems. Such copy service applications include, for example, peer-to-peer remote copy operations. In such applications, data is copied from an information storage and retrieval system source to a target information storage and retrieval system. Some of these copy service applications require both the source and target information storage and retrieval systems to have identical physical and logical configurations. In other data processing applications, it is advantageous to configure the source and target information storage and retrieval systems to be physically and logically similar to facilitate efficient transfer of data. Transferring configurations from a source to a target to accomplish the configuration of the target is often used to produce a target that is compatible with the source. Often a large number of logical objects must be configured at the target, resulting in a time consuming configuration process.

What is needed is an apparatus and method to quickly and efficiently configure the physical and/or logical configuration of a target information storage and retrieval system to be equivalent to an information storage and retrieval system source.

SUMMARY OF THE INVENTION

The present invention provides a system, a method and an article of manufacture to configure information storage and retrieval systems.

In method form, exemplary embodiments include a method to configure information storage and retrieval systems. The method provides a configuration loader user interface for accepting configuration commands, an information storage and retrieval system configuration source, a target information storage and retrieval system and a configuration loader capable of communicating with the configuration loader user interface, with the information storage and retrieval system configuration source and with the target information storage and retrieval system. The configuration loader comprises a configuration loader module for applying the configuration source to the target information storage and retrieval system. Operative to the configuration loader receiving a command from the configuration loader user interface to configure the target information storage and retrieval system using the configuration source, the configuration loader module applies the configuration source to the target information storage and retrieval system to produce a target that is physically and/or logically the same as the source.

In method form, exemplary embodiments further include applying a thread manager for managing at least one thread. The thread executes steps necessary to determine the physical configuration of the information storage and retrieval system configuration source and determine the physical configuration of the target information storage and retrieval system. Operative to a compatibility between the physical configuration of the information storage and retrieval system configuration source and the physical configuration of the target information storage and retrieval system, the thread determines the logical configuration of the configuration source and determines the logical configuration of the target. The thread configures the logical configuration of the target to be the same as the logical configuration of the source.

In other method forms, exemplary embodiments include a method for delivering a service to configure information storage and retrieval systems. The method provides a configuration loader user interface for accepting configuration commands, an information storage and retrieval system configuration source, a target information storage and retrieval system and a configuration loader capable of communicating with the configuration loader user interface, with the information storage and retrieval system configuration source and with the target information storage and retrieval system. The configuration loader comprises a configuration loader module for applying the configuration source to the target information storage and retrieval system. Operative to the configuration loader receiving a command from the configuration loader user interface to configure the target using the configuration source, the configuration loader module determines a cost to apply the configuration source to the target, applies the configuration source to the target and bills a customer for the configuration service.

In system embodiments the present invention provides a system to configure information storage and retrieval systems. The system comprises a configuration loader user interface for accepting configuration commands, an information storage and retrieval system configuration source, a target information storage and retrieval system and a configuration loader capable of communicating with the configuration loader user interface, with the information storage and retrieval system configuration source and with the target information storage and retrieval system. The configuration loader comprises a configuration loader module for applying the configuration source to the target information storage and retrieval system. Operative to the configuration loader receiving a command from the configuration loader user interface to configure the target information storage and retrieval system using the configuration source, the configuration loader module applies the configuration source to the target information storage and retrieval system.

The system embodiments further comprise a thread manager for managing at least one thread. The thread executes steps to determine the physical configuration of the information storage and retrieval system configuration source and determine the physical configuration of the target information storage and retrieval system. Operative to a compatibility between the physical configuration of the configuration source and the physical configuration of the target, the thread determines the logical configuration of the configuration source, determines the logical configuration of the target information storage and retrieval system and configures the logical configuration of the target to be the same as the logical configuration of the configuration source.

These and other benefits of the present invention will be discussed in the following detailed description, which describes aspects of an exemplary system, apparatus, and procedure of the present invention. It will be appreciated by those skilled in the art that although the following detailed description will proceed with reference being made to preferred embodiments and methods of use, the present invention is not intended to be limited to these preferred embodiments and methods of use. Rather, the present invention is intended to be limited only as set forth in the accompanying claims. For a more detailed understanding of the present invention, reference may be made to the following detailed description taken in conjunction with the accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

The present invention is described in preferred embodiments in the following description. The preferred embodiments are described with reference to the Figures. While the present invention is described in conjunction with the preferred embodiments, it will be appreciated by those skilled in the art that it is intended to cover alternatives, modifications, and equivalents as may be included within the spirit and scope of the present invention as defined by the appended claims.

Figure 1:
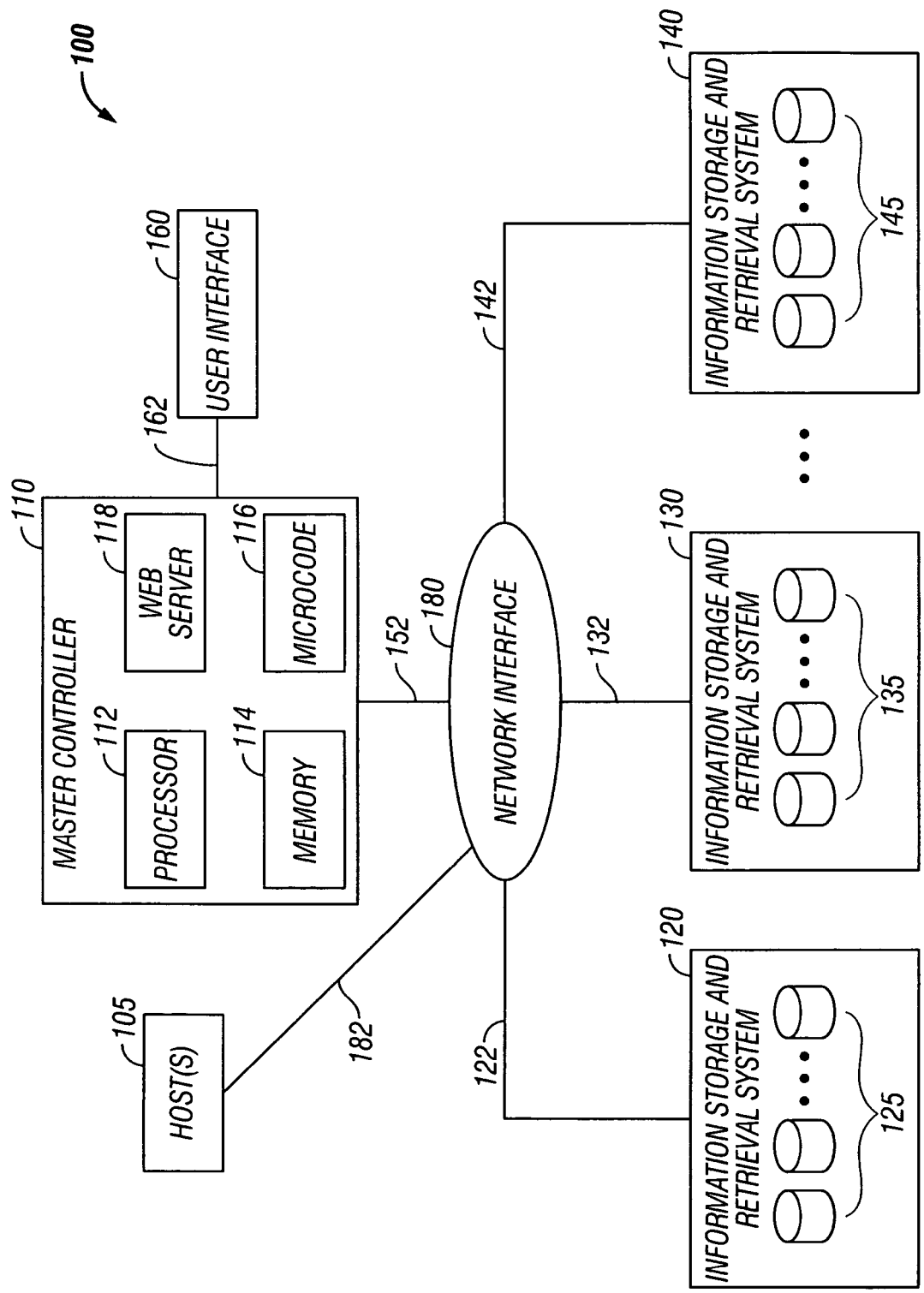
FIG. 1 is an illustration of one embodiment of Applicant's data processing system.

Referring now to FIG. 1, Applicant's data processing system 100 includes a master controller 110 in combination with a plurality of information storage and retrieval systems. For example, in the illustrated embodiment of FIG. 1, Applicant's data processing system 100 includes master controller 110 in combination with information storage and retrieval systems 120, 130, 140, and additional systems not shown.

In certain embodiments, Applicant's system further includes a network interface 180. Network interface 180 may be, for example, a Storage Attached Network ("SAN"), a local area network (LAN), a wide area network (WAN), a private network or combinations thereof. In these embodiments, master controller 110 is capable of communicating with network interface 180 via communication link 152.

Master controller 110 includes processor 112, memory 114, and microcode 116. In certain embodiments, memory 114 comprises non-volatile memory, such as for example, one or more EEPROMs (Electrically Erasable Programmable Read Only Memory), one or more flash PROMs (Programmable Read Only Memory), battery backup RAM, hard disk drive, combinations thereof, and the like.

User interface 160 communicates with master controller 110 via communication link 162. In certain embodiments, communication link 162 may be implemented as network interface 180. In certain embodiments master controller 110 may include user interface 160. In other embodiments, master controller 110 further includes web server 118 which is capable of bidirectional communication using an Internet access link to user interface 160. Host computer 105 is capable of communication with any of the components of data processing system 100 using network interface 180 via communication link 182. In other embodiments, host computer 105 may communicate with any of the components of data processing system 100 directly using for example, a host adapter.

In the illustrated embodiment of FIG. 1, master controller 110 is external to each of Applicant's information storage and retrieval systems comprising system 100. In other embodiments, master controller 110 is integral with one of the information storage and retrieval systems comprising Applicant's data processing system.

Master controller 110 is capable of bidirectional communication with information storage and retrieval systems 120, 130, and 140, using network interface 180, communication link 152 and communication links 122, 132, and 142, respectively. In the illustrated embodiment of FIG. 1, master controller 110 communicates with a plurality of information storage and retrieval systems using network interface 180, such as for example, a SAN. In other embodiments, master controller 110 may also communicate directly with any of the information storage and retrieval systems. In yet other embodiments, master controller 110 communicates directly with one or more information storage and retrieval systems, and with one or other information storage and retrieval systems using network interface 180.

Communication links 122, 132, 142, 152, 162 and 182, are independently selected from the group comprising a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Information storage and retrieval system 120 includes a plurality of information storage media 125. In certain embodiments, plurality of information storage media 125 comprises one or more hard disk drives, one or more tape storage media, one or more optical storage media, one or more electronic storage media and combinations thereof.

Information storage and retrieval system 130 includes a plurality of information storage media 135. In certain embodiments, plurality of information storage media 135 comprises one or more hard disk drives, one or more tape storage media, one or more optical storage media, one or more electronic storage media, and combinations thereof.

Information storage and retrieval system 140 includes a plurality of information storage media 145. In certain embodiments, plurality of information storage media 145 comprises one or more hard disk drives, one or more tape storage media, one or more optical storage media, one or more electronic storage media and combinations thereof.

As those skilled in the art will appreciate, information and retrieval storage systems 120, 130, and 140, may comprise elements in addition to the plurality of storage media shown. As those skilled in the art will further appreciate, such information storage and retrieval systems may further include, without limitation, one or more processors, one or more data buffers, one or more DASD devices, one or more data caches, one or more input/output adapters, one or more storage device adapters, one or more operator input panels, one or more web servers, one or more robotic accessors, one or more data storage devices which include the plurality of storage media 125 and the like.

Figure 2:
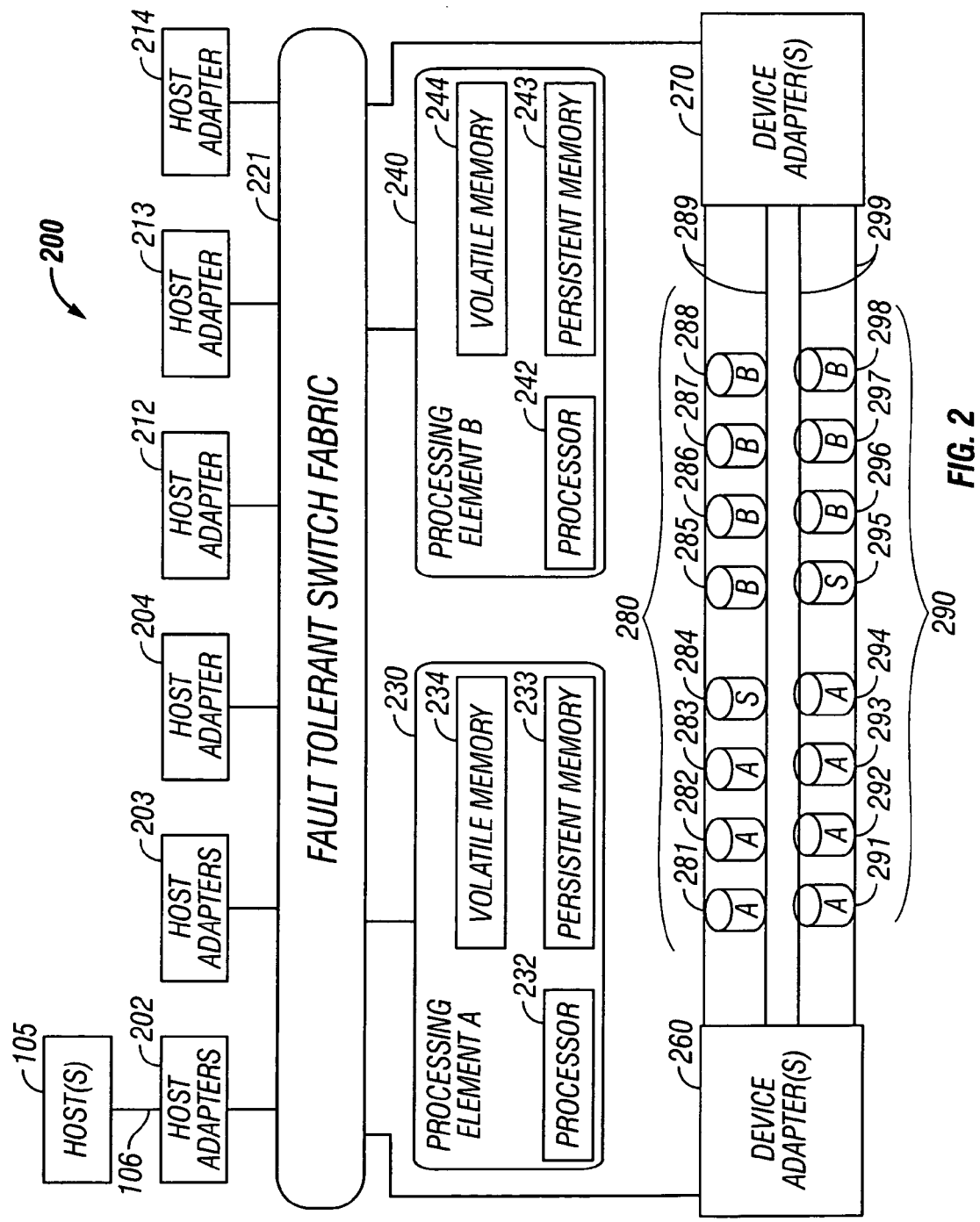
FIG. 2 is an illustration of one embodiment of Applicant's information storage and retrieval system.

Referring now to FIG. 2, in certain embodiments, one or more of information storage and retrieval systems 120 (FIG. 1), 130 (FIG. 1) and 140 (FIG. 1) comprises information storage and retrieval system 200. Information storage and retrieval system 200 is capable of communication with host computer 105 via communication link 106. The illustrated embodiment of FIG. 2 shows a single host computer. In other embodiments, Applicant's information storage and retrieval system is capable of communicating with a plurality of host computers.

Host computer 105 comprises a computer system, such as a mainframe, personal computer, workstation, and combinations thereof, including an operating system such as Windows, AIX, Unix, MVS, LINUX, etc, (Windows is a registered trademark of Microsoft Corporation; AIX is a registered trademark and MVS is a trademark of IBM Corporation; and UNIX is a registered trademark in the United States and other countries licensed exclusively through The Open Group). In certain embodiments, host computer 105 further includes a storage management program. The storage management program in the host computer 105 may include the functionality of storage management type programs known in the art that manage the transfer of data to a data storage and retrieval system, such as the IBM DFSMS implemented in the IBM MVS operating system.

In certain embodiments, Applicant's information storage and retrieval system 200 includes a plurality of host adapters 202, 203, 204, 212, 213 and 214, disposed in host bays (not shown). In other embodiments, Applicant's information storage and retrieval system includes more or less than the six host adapters shown. Regardless of the number of host adapters disposed in any embodiments of Applicant's system, each of those host adapters comprises a shared resource that has equal access to both processing elements 230 and 240. Each host adapter may comprise one or more Fibre Channel ports, one or more FICON ports, one or more ESCON ports, or one or more SCSI ports or other interface protocol known in the art. Each host adapter is connected to both processing elements 230 and 240 through fault tolerant switch fabric 221 such that each processing element 230, 240 can manage I/O from any host adapter.

Processor element 230 includes processor 232, volatile memory 234 and persistent memory 233. In certain embodiments, memory devices 233, 234 comprise random access memory or non-volatile memory. Cache may be implemented in any of the elements of processor element 230.

Processor element 240 includes processor 242, volatile memory 244 and persistent memory 243. In certain embodiments, memory devices 243, 244 comprise random access memory or non-volatile memory. Cache may be implemented in any of the elements of processor element 240.

I/O to storage devices portion 260 comprises a plurality of device adapters, such as device adapters for interfacing to storage devices. I/O portion 270 further comprises a plurality of device adapters, such as device adapters for interfacing to storage devices.

In certain embodiments of Applicant's system, one or more host adapters, processor element 230 and one or more device adapters are packaged together on a single card disposed in Applicant's information storage and retrieval system. Similarly, in certain embodiments, one or more host adapters, processor element 240 and one or more device adapters are disposed on another card disposed in Applicant's information storage and retrieval system. In these embodiments, Applicant's system 200 includes two cards interconnected with a plurality of data storage devices.

In the illustrated embodiment of FIG. 2, sixteen data storage devices are organized into two arrays, namely array "A" and array "B". The illustrated embodiment of FIG. 2 shows two storage device arrays. In other embodiments, Applicant's information storage and retrieval system includes more than two storage device arrays. Each storage array appears to a host computer as one or more logical devices.

In certain embodiments, one or more of the data storage devices comprise a plurality of hard disk drive units. In the illustrated embodiment of FIG. 2, disk array "A" includes disk drives 281, 282, 283, 291, 292, 293 and 294. Disk array "B" includes disk drives 285, 286, 287, 288, 296, 297 and 298. In certain embodiments, arrays "A" and "B" utilize a RAID (Redundant Array of Independent Disks) protocol. In certain embodiments, arrays "A" and "B" comprise what is sometimes called a JBOD array, i.e. "Just a Bunch Of Disks" where the array is not configured according to RAID. As those skilled in the art will appreciate, a RAID rank comprises independent disk drives configured in an array of disk drives to obtain performance, capacity and/or reliability that exceeds that of a single large drive. In the illustrated embodiment of FIG. 2, disks labeled "S" indicates a spare disk that may be used to replace a failed data disk. The spare disks include disk drives 284 and 295. The data disks, in this figure, are 281, 282, 283, 291, 292, 293, 294, 285, 286, 287, 288, 296, 297 and 298.

The illustrated embodiment of FIG. 2 shows two storage device arrays. In other embodiments, Applicant's system includes a single storage device array. In yet other embodiments, Applicant's system includes more than two storage device arrays.

The interface structure 289, 299 to storage devices 280, 290 shown in FIG. 2 comprises one embodiment of Applicant's system. In other embodiments, link 289 and/or 299 comprises a switched fabric or a combination of a switch and loop topologies. In other embodiments, link 289 and/or 299 comprises dual FC-AL loops of switches. Each loop contains one or more Fibre Channel switches.

In certain embodiments, one or more Applicant's information storage and retrieval systems 120, 130, 140 comprises an automated media library comprising a plurality of tape cartridges, one or more robotic accessors, and one or more tape drives. U.S. Pat. No. 5,970,030, assigned to the common assignee herein, describes such an automated media library and is hereby incorporated by reference. In certain embodiments, one or more of Applicant's information storage and retrieval systems 120, 130, 140 comprises a virtual tape system. U.S. Pat. No. 6,269,423, assigned to the common assignee herein, describes such a virtual tape system, and is hereby incorporated by reference.

Figure 3:
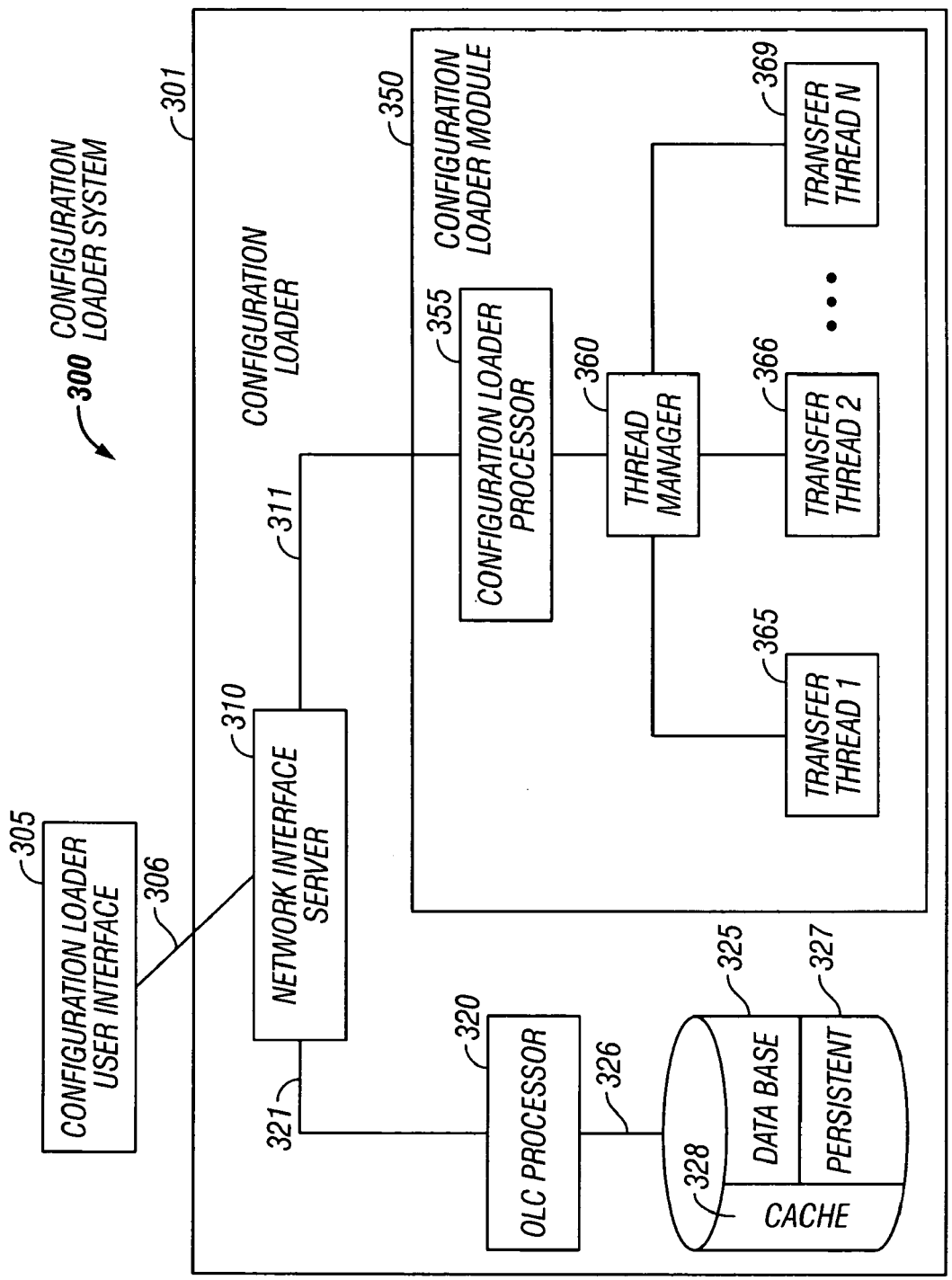
FIG. 3 is an illustration of one embodiment of Applicant's configuration loader system.

With reference to FIG. 3, a configuration loader system 300 that may be used to implement the present invention is described. The configuration loader system is responsible for loading or transferring logical and/or physical configurations from a source storage facility image (SFI) to a target SFI. The source SFI may be, for example, an information storage and retrieval system configuration source. The target SFI may be, for example, an information storage and retrieval system configuration target. The source or target system may be a physical system (i.e. systems 120, 130, 140) or a virtual system (i.e. a configuration stored in memory). Herein a source refers to an information storage and retrieval system configuration source and a target refers to an information storage and retrieval system configuration target.

In certain embodiments, configuration loader user interface 305 is used to allow a user to submit commands to configuration loader 301 by accepting configuration commands from a user or other source. In the preferred embodiment, the commands are sent asynchronously to configuration loader 301. After the command is sent, configuration loader 301 returns a message to the sender that the command is accepted or rejected. For example, if a command is sent to start a configuration transfer, configuration loader 301 accepts the command and returns a message to the user interface 305 indicating that the command is accepted. Configuration loader 301 may then process the command and simultaneously accept new commands. This capability allows user interface 305 to remain active (i.e. submit or receive commands and information) and not to have to wait until the first command completes before executing additional commands. In other embodiments, the commands may be transmitted synchronously. In certain embodiments, configuration loader interface 305 may be implemented on a separately network-connected computer system, such as a mainframe, personal computer, workstation, server and combinations thereof. In certain embodiments, configuration loader interface 305 may provide a graphical user interface (GUI), command line interface (CLI) or other system to allow a user to select and run configuration transfers or loads between source and target systems. In certain embodiments, configuration loader interface 305 may be implemented by user interface 160 (FIG. 1). Configuration loader interface 305 uses communication link 306 to communicate with configuration loader 301 via network interface server 310. Communication links 306, 321, 311 and 326, are independently selected from the group comprising a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, configuration loader 301 comprises network interface server 310, offline configuration processor (OLC) 320, database 325 and configuration loader module 350. Network interface server 310 provides a network connection for the components and provides the ability to perform configurations in a network-connected fashion so that users may start configuration transfers and disconnect without interrupting the transfers. The client-server design of configuration loader user interface 305 and configuration loader 301, respectively, along with the ability to send asynchronous commands to configuration loader 301 provides the ability to disconnect configuration loader interface 305 without interrupting any configuration transfer. Network interface server 310 communicates with configuration loader module 350 and OLC processor 320 via communication links 311 and 321.

OLC processor 320 interfaces with database 325 via communication link 326. OLC processor 320 and database 325 provide a repository for offline storage systems configuration. OLC processor 320 allows users to create virtual configuration images for modeling and pre-planning of their storage configuration images. OLC processor 320 maintains one or more virtual configurations in a database (i.e. database 325). OLC processor 320 also maintains a task list for configuration transfers. Herein, task list and list of tasks are used interchangeably with the same meaning. For example, if a source has a logical object (i.e. RAID Array) which needs to be transferred to a target, the configuration information that includes the object is stored in database 325 as an offline configuration. Database 325 includes cache 328 and persistent 327. In other embodiments, the OLC processor 320 may maintain the task list in cache memory 328. Cache memory 328 may be used for volatile fast storage of temporary data. Persistent 327 may provide nonvolatile long term storage of data. Both cache memory 328 or persistent 327, or combinations thereof, can be used to temporarily store incoming configuration object requests (i.e. adding/creating, deleting/removing, and/or modifying configuration objects) from configuration loader user interface 305 in offline configuration storage (325, 327, 328). For example, when configuration loader user interface 305 creates a logical object, such as a volume, in information storage and retrieval system 140, the volume could also be added to the offline configuration. The offline configuration could then be used as a cached copy of the actual configuration existent on information storage and retrieval system 140. This would reduce costly retrieval times for very large configurations when transferring the configuration from information storage and retrieval system 140 to a target system. The target system may be an offline or virtual configuration, of which the configuration already exists in the offline memory storage. The target system only needs to communicate with configuration loader user interface 305 to be used as a target. In another embodiment, the target may be a configuration transfer to another information storage and retrieval system. In an alternative embodiment, an individual transfer thread 365-369 may maintain a task list for the configuration transfer managed by any transfer thread. For example, if a source has a logical object (e.g. RAID Array) that needs to be transferred to a target, the configuration information that includes the logical object may be stored in a memory of and/or associated with transfer thread 365-369. The memory of a transfer thread may be physically located in, for example, a computing device used for the execution of a transfer thread. The memory of a transfer thread may be physically located in or associated with configuration loader processor 355, thread manager 360, network interface serve 310 or any component associated with configuration loader system 300.

Configuration loader module 350 is responsible for maintaining and providing controls access (i.e. start, cancel, etc.) to all configuration transfers. In certain embodiments, configuration loader module 350 comprises configuration loader processor 355, thread manager 360, and one or more transfer threads 365, 366-369. Configuration loader processor 355 provides interpretation and execution of configuration commands and reporting of the status of the system to/from configuration loader interface 305. In the preferred embodiment the status is reported asynchronously back to the user interface application running on configuration loader interface 305. Configuration loader processor 355 is also responsible for maintaining a list of all started, canceled, suspended and completed transfer threads. In certain embodiments one or more client users are using one or more configuration loader interfaces 305. Configuration loader processor 355 controls configuration requests received from the client users while maintaining the status of all configuration transfer operations. Configuration loader processor 355 may also maintain a list, in nonvolatile storage (i.e. database 325), of the ongoing configuration load operations. If a power failure or other error condition occurs, configuration loader module 350 has the capability to determine which operations haven't completed and restart the incomplete operations.

Thread manager 360 is responsible for maintaining all transfer threads. For each configuration transfer between a source and a target, configuration loader module 350 will spawn a single thread (i.e. threads 365-369) using configuration loader processor 355 and thread manager 360. For each configuration transfer, multiple threads may be spawned and exist at any time to apply the configuration source(s) to target information storage and retrieval system(s). There may be as many threads, or configuration transfers, at one time as memory allows. Thread manager 360 manages all currently active threads. The use of threads allows multiple configuration loads to occur simultaneously.

Figure 4:
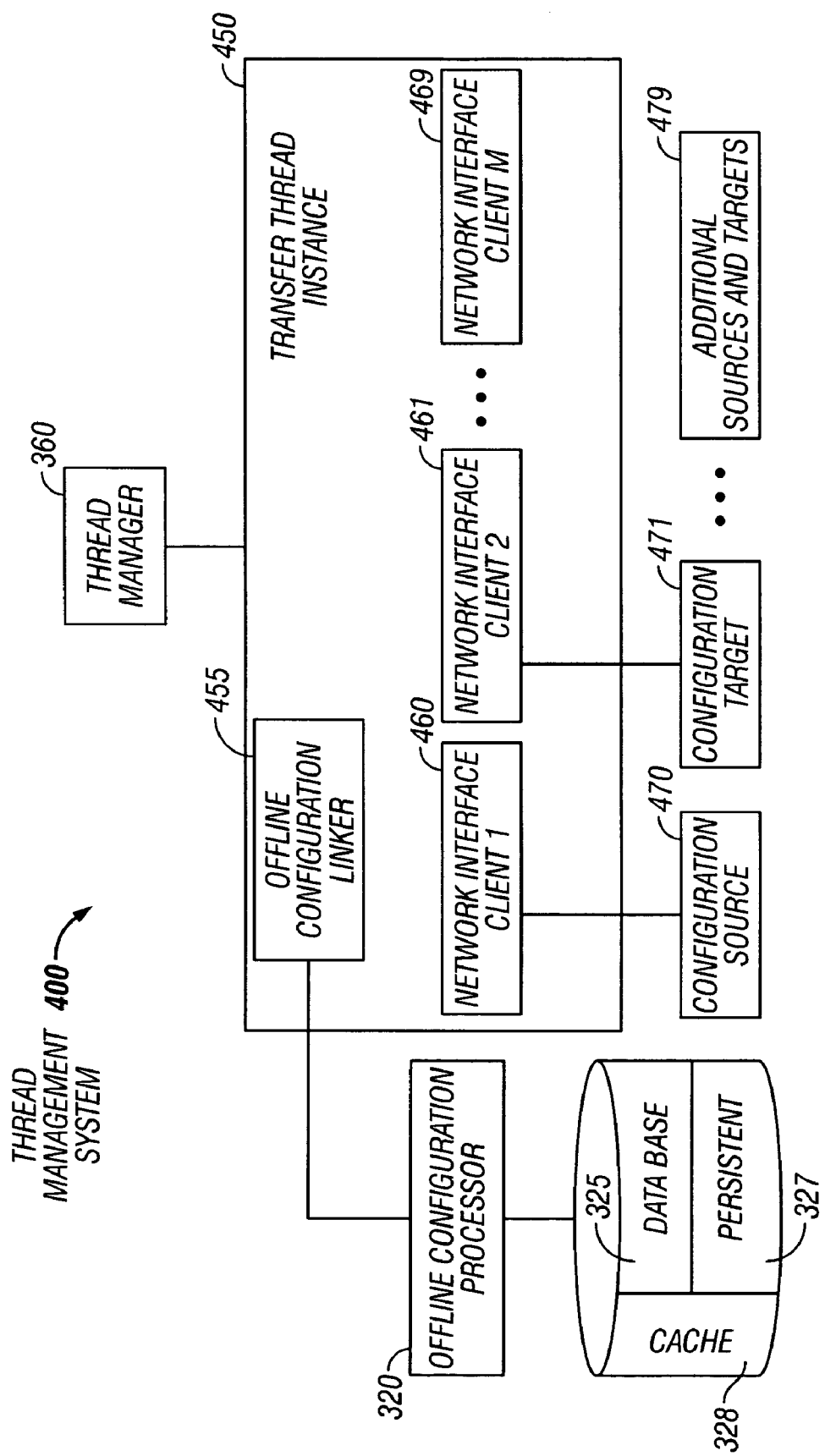
FIG. 4 is an illustration of one embodiment of Applicant's thread management system.

FIG. 4 shows one embodiment of a thread management system 400 for use with the present invention. In certain embodiments, each transfer thread (i.e. any one of transfer threads 365-369) spawned to execute a configuration transfer is a transfer thread instance 450. Transfer thread instance 450 connects a configuration source (i.e. configuration source 470) to a configuration target (i.e. configuration target 471) using, for example, one or more network interface clients 460-469. In the preferred embodiment, a configuration may be transferred from a single source to multiple targets (for example N targets; where N is the number of targets) by creating N transfer thread instances. Alternatively, a configuration may be transferred from a single source to multiple targets by using multiple source and target network interface clients (i.e. 460-469). In addition, transfer thread instance 450 connects to database 325 through offline configuration linker 455 and offline configuration processor 320. Database 325 provides persistently maintainable configuration storage (nonvolatile storage) of source configurations, a configuration task list and cached configurations. Offline configuration processor 320 has the ability to store more than one virtual configuration image of an information storage and retrieval system. Configuration loader 301 uses offline configuration processor 320 and database 325 to store a task list of items to be transferred from a configuration source (i.e. configuration source 470) to a configuration target (i.e. configuration target 471). The task list is built by loading a configuration image from a configuration source (and verifying each object for compatibility with the configuration target). As each configuration object completes its installation on the respective configuration target, the configuration object is then removed from the task list. If or when interruptions occur (i.e. power outage, or network interrupts), the configuration loader 301 is able to determine where the configuration process was interrupted because the task list is persistently maintained in the OLC database.

In certain embodiments, each transfer thread (i.e. any one of transfer threads 365-369) is a thread executing a configuration transfer while updating the status of the configuration transfer at significant checkpoints in the process. In the preferred embodiment, the thread is a [i]Java*™* thread. A significant checkpoint may be, for example, 5% increments of progress or other user defined increments. Configuration loader 301 provides the ability to report status incrementally, at significant checkpoints; however, this capability does not have to be used to provide a configuration transfer. In certain embodiments, the configuration transfers and the respective status are maintained by Java objects. For example, each configuration transfer may be maintained within a single transfer Java object and each transfer object maintains a single status Java object. The transfer objects contain specific information about the transfers. The status objects are retrievable by the using applications executing on configuration loader user interface 305. The status objects provide methods to obtain the transfer's status. This allows using applications executing on configuration loader user interface 305 to report the status of the transfers to the users. For example, operative to a completion of the application of the configuration source to the target information storage and retrieval system, the configuration loader may communicate the status of one or more configuration transfers to the configuration loader user interface. The status of the transfer may comprise any type of statistical data about the transfers. For example, the amount of time to execute a transfer, a group of transfers, means, standard deviation, etc. for multiple transfers, the type of configuration objects transferred (i.e. ranks versus volumes), etc. Additionally, the status of any transfer complete or not may be obtained at any time.

[i]Java and all Java-based trademarks are trademarks of Sun Microsystems, Inc. in the United States, other countries, or both.

In certain embodiments, each transfer thread creates at least two or more network interface client connections to a configuration source (i.e. configuration source 470) and to a configuration target (i.e. configuration target 471).

In certain embodiments, transferring configurations requires analyzing the physical configuration compatibility of the source and target. Before a configuration transfer can be accomplished, configuration loader 301 analyzes the source and target physical configurations to determine the physical configuration of the information storage and retrieval system configuration source and the physical configuration of the target information storage and retrieval system. Configuration loader 301 then determines if every physical object from the source has a physical counterpart on the target. If a counterpart does not exist then the transfer cannot occur because of a physical incompatibility. If the source and target are compatible then the configuration of the target may proceed by use of the Applicant's invention. In the preferred embodiment, configuration loader system 300 first verifies that each specified physical object exists on both the source and target. If all specified physical objects exist on both the source and target, the physical verification is complete and the process continues to perform a logical verification and then execute the transfer of the configuration. If the target does not contain the respective source physical object, then it is necessary to determine if a logical object needs to be transferred from the source to target within the respective physical location. If a logical object does not need to be transferred from the source to target within the respective physical location the process continues by examining the other physical objects. If a logical object does need to be transferred from the source to target within the respective physical location, verification fails and the configuration transfer does not proceed because of incompatibilities between the physical configurations. In the preferred embodiment, the physical verification is accomplished first before the logical verification/analysis may proceed.

Figure 5:
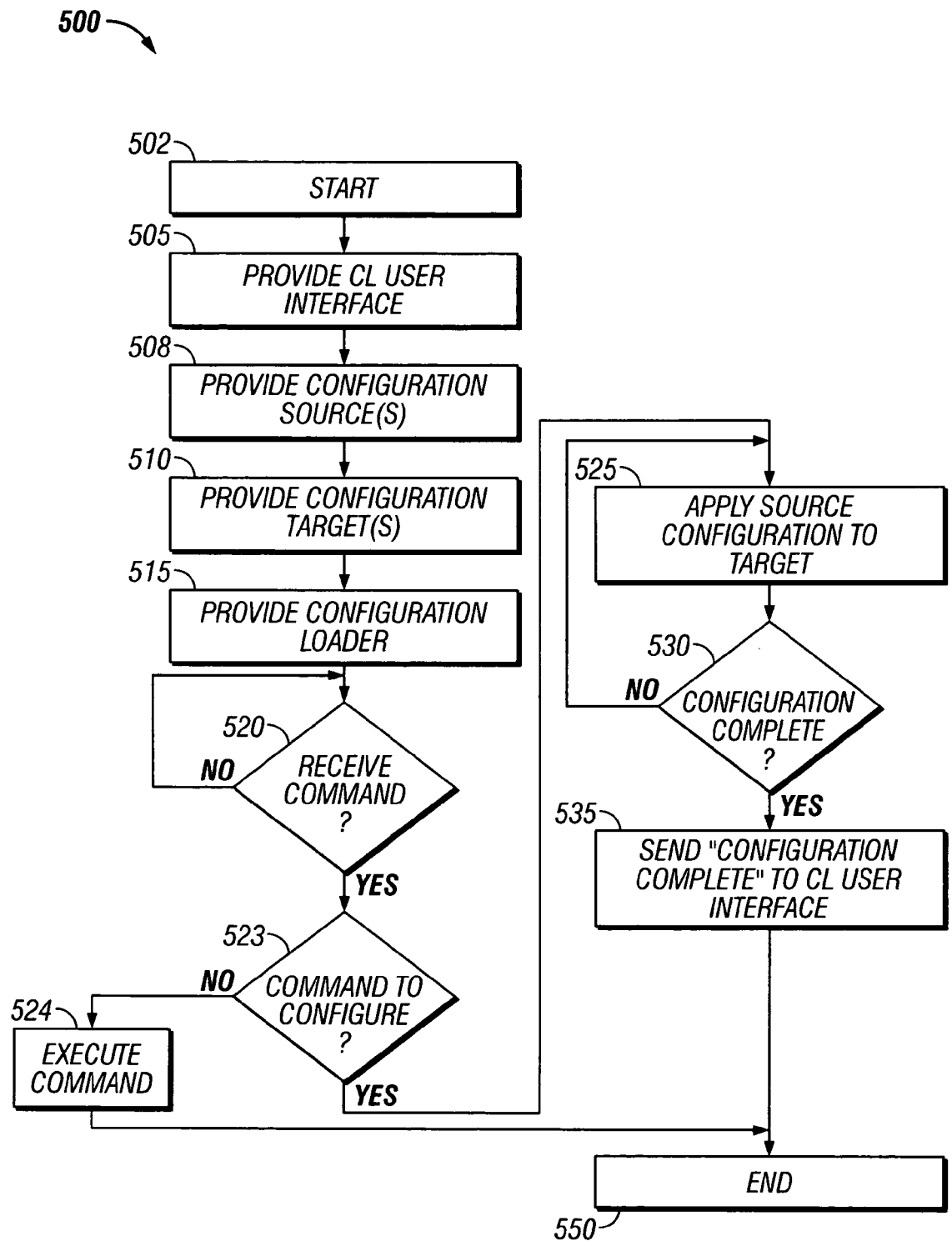
FIG. 5 illustrates a flowchart showing a process to implement an embodiment of the present invention to configure information storage and retrieval systems.

FIG. 5 summarizes certain initial steps of Applicant's method to configure information storage and retrieval systems. Referring now to FIG. 5, at step 505 the method provides a configuration loader user interface for accepting configuration commands. In the preferred embodiment, the configuration loader user interface provided may be configuration loader interface 305 described above. Configuration commands may comprise, for example, a transfer command to transfer a physical and/or logical configuration from a source to a target information storage and retrieval system. Configuration commands may additionally comprise commands to determine configurations, determine the status of a transfer, cancel a transfer, suspend a transfer, list completed transfers, list suspended transfers, list canceled transfers, list active transfers, list partial configurations, perform partial configuration transfers, resume an already started transfer or any other command needed for transferring configurations. The configuration loader user interface may accept configuration commands from a user, operator, computer system, etc.

At step 508 the method provides at least one information storage and retrieval system configuration source. An information storage and retrieval system configuration source may be a configuration maintained on, for example, any of systems 120 (FIG. 1), 130 (FIG. 1), 140 (FIG. 1). The configurations existing on the source may have been originally setup from a host computer (i.e. host(s) 105) over a network connection (i.e. network interface 180). Alternatively, the configuration could have been setup from user interface 160 through the master controller 110 and network interface 180, or combinations thereof. An information storage and retrieval system configuration source also may be a virtual or offline configuration maintained by OLC processor 320 and stored in database 325, or combinations thereof. Each configuration source is capable of communicating with configuration loader 301.

At step 510 the method provides at least one target information storage and retrieval system. A target information storage and retrieval system may comprise, for example, any of systems 120 (FIG. 1), 130 (FIG. 1), 140 (FIG. 1), a virtual or offline configuration maintained by OLC processor 320 to be stored in database 325, a configuration sent to configuration loader user interface 305 (FIG. 3), a configuration sent to a host computer (i.e. host(s) 105) a configuration sent over a network connection (i.e. network interface 180) or combinations thereof. Each configuration target is capable of communicating with configuration loader 301.

At step 515, the method provides a configuration loader capable of communicating with a configuration loader user interface, with at least one information storage and retrieval system configuration source and with at least one target information storage and retrieval system. The configuration loader comprises a configuration loader module for applying the configuration source to a target information storage and retrieval system. In the preferred embodiment, the configuration loader may be, for example, configuration loader 301 described above. The configuration loader communicates with the configuration loader user interface, with an information storage and retrieval system configuration source and with a target information storage and retrieval system using, for example, network interface server 310 as described above. The configuration loader uses any of network interface clients 460-469 for communication with an information storage and retrieval system configuration source and with a target information storage and retrieval system. The configuration loader module for applying the configuration source to a target information storage and retrieval system may be, for example, configuration loader module 350 described above.

At step 520 the method provides a loop to wait for a configuration command. As described above, configuration commands may additionally comprise commands to determine configurations, determine the status of a transfer, cancel a transfer, suspend a transfer, list completed transfers, or any other command needed for transferring configurations. If a command is received, then control flow to step 523.

At step 523 the method provides a decision to determine if the command received is to configure a target information storage and retrieval system using a configuration source. If the command received is not to configure a target information storage and retrieval system using a configuration source, then control flows to step 524 to execute the command. The command executed at step 524 may comprise commands to determine configurations, determine the status of a transfer, cancel a transfer, suspend a transfer, list completed transfers, or any other command needed for transferring configurations as described above. After execution of step 524, control flows to step 550 to end.

If at step 523, the command received is a command to configure a target information storage and retrieval system, then control flows to step 525 where configuration loader module 350 applies a configuration source to a target information storage and retrieval system. Execution of steps 523 and 525 may be accomplished by Applicants' system described above. For example, operative to configuration loader 301 receiving a command from configuration loader user interface 305 to configure a target information storage and retrieval system using a configuration source, configuration loader module 350 applies the configuration source to the target information storage and retrieval system. In the preferred embodiment, a command to configure is received from configuration loader user interface 305, however a command may also be received from other sources, for example, from an information storage and retrieval system (i.e. any of systems 120, 130, 140), OLC processor 320, a host computer (i.e. host(s) 105), a network connection (i.e. network interface 180) or combinations thereof.

The application of the configuration source to a target information storage and retrieval system at step 525 may be accomplished by, for example, the thread management system 400 shown in FIG. 4 and described above. In the preferred embodiment, step 525 is accomplished by process 600 shown in FIG. 6 and described below.

After execution of step 525, control flows to step 530 to determine if the configuration is complete. Operative to the completion of the application of the configuration source to the target information storage and retrieval system, the configuration loader communicates to the configuration loader user interface the completion of the application of the configuration source to the target information storage and retrieval system. If at step 530 it is determined that the configuration is complete then control transfers to step 535 to send a message to configuration loader user interface 305 that the configuration is complete. In certain embodiments, completion of the application of the configuration source to the target information storage and retrieval system may comprise a partial configuration of the target. This may occur when the configuration loader module applies the configuration source to the target information storage and retrieval system in a way to produce a partial configuration of the target information storage and retrieval system. Partial configuration transfers may be accomplished by transferring only a subset of configuration objects from the source to target. A partial configuration may be, for example, to transfer only four ranks (and the respective logical volumes) to a target from a total of eight ranks from the source. Partial configuration may be the result of interactive communication with configuration loader user interface 305 during the configuration process. After execution of step 535, control flows to step 550 where the process ends.

Figure 6:
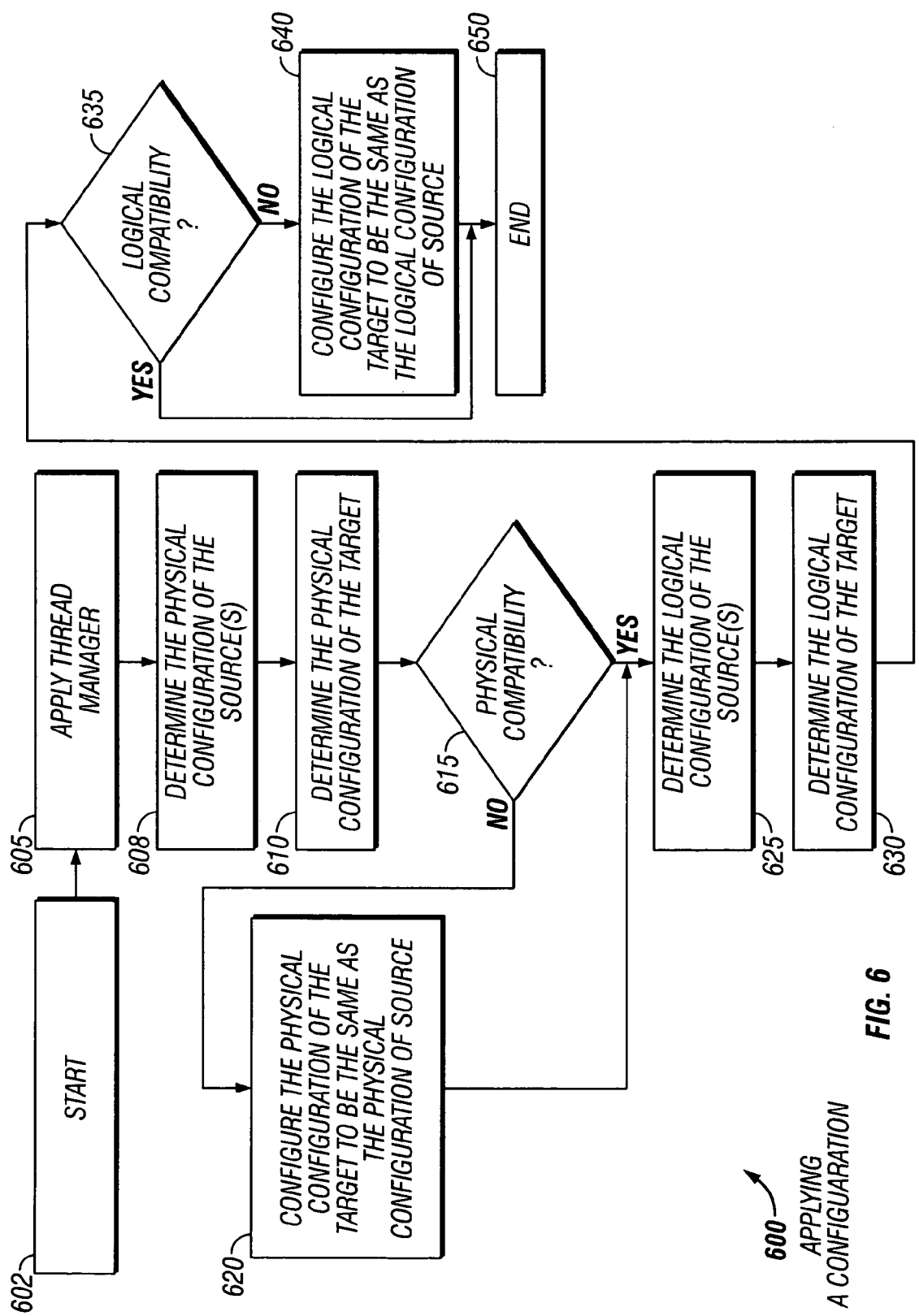
FIG. 6 illustrates a flowchart showing a process to implement an embodiment of the present invention to apply a configuration from a source to a target information storage and retrieval system.

In the preferred embodiment the execution of step 525 for the application of the configuration source to a target information storage and retrieval system may be accomplished by process 600 shown in FIG. 6. Process 600 begins by applying a thread manager, such as for example, thread manager 360 of thread management system 400 (FIG. 4) described above.

Thread manager 360 is used for managing at least one thread (i.e. threads 365, 366-369), wherein the thread executes the steps (i.e. steps 608-650) necessary to accomplish the configuration. As described above with reference to FIG. 4, each transfer thread (i.e. any one of transfer threads 365-369) spawned to execute a configuration transfer may be a transfer thread instance 450. In the preferred embodiment, transfer thread instance 450 connects a configuration source (i.e. configuration source 470) to a configuration target (i.e. configuration target 471) using, for example, one or more network interface clients 460-469. Once a source and target are connected the configuration may proceed under the direction of, for example, transfer thread instance 450 to execute steps 608-650 to accomplish the configuration. In addition to connecting the sources and targets, the threads may also establish a private link/connection to OLC processor 320 and database 325. As described above, database 325 is used to store a task list to accomplish the configuration transfer. In the preferred embodiment, at least three connections (i.e. source, target and database) are maintained during the execution of steps 608-650.

At step 608, the physical configuration of the information storage and retrieval system configuration source is determined. This may be accomplished by configuration loader 301 sending a command to request the physical configuration of a source using a source network interface client (i.e. network interface 460) connection. Each information storage and retrieval system provides a user interface for retrieving/storing and/or setting physical and/or logical configuration parameters and/or objects. The network interface clients connect to these user interfaces. A command to obtain the configuration of the information storage and retrieval system source is used to obtain information about the physical objects (i.e. number and location of disk packs, number and setting of host adapters, etc.) of the source. Physical objects are entities in which logical entities are maintained. A physical object may be, for example, the array of disks (or 8-packs) (i.e. 280, FIG. 1) in which the ranks and logical volumes are stored on. The array of disks, also known as array sites (i.e. 280, FIG. 1), have a physical location (i.e. on device adapters pair 1, first of six 8-pack group number) and therefore can be compared with the target location for compatibility (i.e. does there exist an array site on the target in the same device adapter pair and group location as the source?). A host adapter(s) (202-214) may also be a physical object, because a host adapter stores a logical configuration setting (i.e. technology type: Fibre Channel, FICON, ESCON, or SCSI, as well as number of ports, etc.) Host adapters also have a physical location used for comparison (i.e. bay number and slot number). Lastly, device adapters (260, 270) are a physical object because device adapters maintain the logical subsystem (LSS) number. Device adapters (260, 270) also have a physical location indicator (i.e. adapter pair number on a cluster).

At step 610, the physical configuration of the target information storage and retrieval system configuration is determined. This may be accomplished by configuration loader 301 sending a command to request the physical configuration of a target using a target network interface client (i.e. network interface 461) connection. Each information storage and retrieval system provides a user interface for retrieving/storing and/or setting physical and/or logical configuration parameters and/or objects. The network interface clients connect to these user interfaces. A command to obtain the configuration of the target information storage and retrieval system is used to obtain information about the physical objects (i.e. number and location of disk packs, number and setting of host adapters, etc.) of the target. As explained above, physical objects are entities in which logical entities are maintained.

At step 615, operative to a compatibility between the physical configuration of the information storage and retrieval system configuration source and the physical configuration of the target information storage and retrieval system, steps 625 and 630 are executed to determine the logical configuration of the source and target. The physical compatibility between the source and the target are compared at step 615 and if there is a physical incompatibility then step 620 (explained below) is executed. An example of physical compatibility is for every physical object existing at the source, there must also exist the same physical object type at the target. Determining the physical compatibility between a source and target may be accomplished by comparing each physical object of the source and target information storage and retrieval systems. The storage systems are compatible if a physical object existing at a location (i.e. slot, bay, card, etc.) at the source has a corresponding physical object at the same location at the target. If this condition is not met, then an incompatibility exists, and further analysis is performed to determine if the physical incompatibility has an effect on the desired logical configuration of the target for a particular configuration transfer. If the physical incompatibility has an effect on the desired logical configuration of the target for a particular configuration transfer, then the transfer should not continue. Alternatively, if the physical incompatibility has no effect on the desired logical configuration of the target for a particular configuration transfer then the transfer may continue. The analysis determines if there exists any logical object in the configuration transfer from the source to the target that is affected by the physical incompatibility. If no logical object in the configuration transfer is affected by the physical incompatibility, then the systems are considered physically compatible and the transfer thread instance (i.e. thread instance 450) is able to perform the configuration transfer despite the physical incompatibility.

If a logical object does exist in the configuration transfer that requires a corresponding physical object, then the transfer thread instance (i.e. thread instance 450) is unable to perform the configuration transfer because the necessary physical configuration on the target information storage and retrieval system (i.e. systems 120, 130, 140) does not exist or is incompatible. As a result, the systems are considered physically incompatible and step 620 is executed to configure the physical configuration of the target information storage and retrieval system to be the same as the physical configuration of the information storage and retrieval system configuration source. In the preferred embodiment, configuration loader 301 notifies configuration loader user interface 305 of the physical incompatibility. The physical configuration compatibility (i.e. step 615) verification process is performed for every physical object in the source information storage and retrieval system.

For every configuration transfer, the physical configuration compatibility of the source and target SFI needs to be analyzed. For example, to transfer an array site (i.e. an array of physical disks that make up a rank or RAID array) from an offline configuration to an online system there must exist an array site at the same location on the target SFI as on the source SFI. Array sites are defined as a grouping of disks providing a physical construct for the rank or RAID array. A rank may comprise, for example, a grouping of disks that is formatted for RAID technology (striping, mirroring, etc.) Before a rank is created there must be an array site created (also a group of disks) that are not yet formatted for the rank or RAID Array.

Operative to an incompatibility between the physical configuration of the information storage and retrieval system configuration source and the physical configuration of the target information storage and retrieval system, step 620 is executed. At step 620, the configuring of the physical configuration of the target information storage and retrieval system to be the same as the physical configuration of the information storage and retrieval system configuration source is accomplished. Step 620 may be accomplished by, for example, configuration loader 301 modifying a physical object on the target to be compatible with the source. Step 620 may be accomplished differently depending upon the source and target. If the target is a virtual configuration (i.e. a configuration in database 325 via OLC processor 320), then physical objects may be added to the configuration image (i.e. adding additional 8-packs or adapters) by configuration loader 301. If the target is a physical configuration (i.e. an information storage and retrieval system 120-140, etc.), then physical objects may be added by a person manually installing the physical objects on the target. This may be accomplished by, for example, configuration loader 301 sending a message to configuration loader interface 305 to an operator using configuration loader interface 305 to manually configure the target. Upon receiving the message, the operator may physically configure the target or instruct others to accomplish the physical configuration of the target. The use of "same" in configuring the physical configuration of the target information storage and retrieval system to be the same as the physical configuration of the information storage and retrieval system configuration source means that the source and target are physically similar enough to proceed with the logical configuration.

Execution of step 615 with a "yes" result or execution of step 620 results in the execution of step 625. At step 625, a determination of the logical configuration of the information storage and retrieval system configuration source is accomplished. This may be accomplished by configuration loader 301 sending a command to request the logical configuration of a source using a source network interface client (i.e. network interface 460) connection. The logical configuration of the source may be obtained simultaneously with the physical configuration of the source by use of single or multiple commands to the source at any time. For example, the logical and physical configurations of the source may be obtained at step 608 described above. After execution of step 625, control transfers to step 630 where a determination of the logical configuration of the target information storage and retrieval system is accomplished. This may be accomplished by configuration loader 301 sending a command to request the logical configuration of a target using a target network interface client (i.e. network interface 461) connection. The logical configuration of the target may be obtained simultaneously with the physical configuration of the target by use of single or multiple commands to the target at any time. For example, the logical and physical configurations of the target may be obtained at step 610 described above. Because it is possible to have an already existing logical configuration on the target, the logical configuration of the source and target are compared to determine if there is a difference. Each logical element from the source and target are individually analyzed to determine the differences between the source and the target. The logical configuration includes one or more logical objects. Logical objects may comprise logical arrays, ranks, virtual ranks, segment pools, logical subsystems, base volumes, alias volumes, FICON host adapters, SCSI host adapters, volume groups. At step 635, the logical compatibility of the source and target are compared. If the source and target are logically compatible then the process flows to step 650, if not then step 640 is executed. At step 640, configuring the logical configuration of the target information storage and retrieval system to be the same as the logical configuration of the information storage and retrieval system configuration source is accomplished. Step 640 may be accomplished by use of a task list of steps to execute to configure the logical objects of the target. The task list is constructed by comparing the source and targets to determine the logical object to be transferred/modified on the target image.

Logical objects may comprise the following:
1. Arrays: logical grouping of disks for RAID array.
2. Ranks: higher levels of grouping of disks (made up of arrays).
3. Virtual ranks: logical space used to store virtual extents.
4. Segment pools: grouping segments (volumes are made up of segments) that span across ranks.
5. LSS (logical subsystem): logical storage partitions associated with a device adapter.
6. LCU (logical control units): another implementation of LSS's.
7. Base volumes: the basic storage construct, which is made up of segments or blocks of disk space.
8. Alias volumes: alternative labels that references base volumes.
9. Host ports/adapters: used to connect the host systems to the host adapters within the storage server (i.e. host adapter 202).
10. Volume groups: a grouping of volumes.

In the preferred embodiment, a task list is constructed from the analysis of steps 615 to 635 to accomplish step 640. Steps 620 and/or step 640 are the result of applying a configuration source to a target information storage and retrieval system and may be accomplished, by for example, executing a task list of configuration actions, where the task list is persistently maintained in an offline configuration database. The task list may comprise a list of tasks to execute to configure the target to have logical objects and/or physical objects that are equivalent to the source. The application of the configuration source to a target information storage and retrieval system may be accomplished by executing one or more task lists of configuration actions. In the preferred embodiment, the task list is persistently maintained in an offline configuration database (i.e. database 325, 327, 328). Each of the configuration actions is a task. The tasks may add, remove or modify logical objects at the target. OLC processor 320 and database 325 may be used to retrieve and store logical objects for either the source or target. In the preferred embodiment, a configuration of logical objects is created and stored in database 325 by OLC processor 320 that represents the source configuration. Configuration loader 301 by use of the task list (or other means) transfers the source configuration stored in database 325 to the target. Each task in the task list may represent the removal, addition or modification of a logical object. Each task is removed from the task list upon completion. If an adverse condition is experienced resulting in the halting of a transfer, then configuration loader 301 will automatically attempt to reconnect with the source and target and resume the transfer using the task list, from the point where the transfer was halted. After completion of the logical configuration the process flows to step 650 to end.

In certain embodiments, the operation of the present invention may be accomplished by providing a client computer system for operation of configuration loader user interface 305 and providing a server computer system in communication with the client computer system, for operation of configuration loader 301. The client and/or server computer systems may comprise a host computer, a mainframe computer, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The client and/or server computer systems may reside or be part of host(s) 105, client(s) 460-469, server 310, storage controller(s) 120-140, or any other computing system connected to or associated with data processing system 100.

In certain embodiments, an offline storage controller is used as a target information storage and retrieval system. For example, any of storage controllers 120, 130 and/or 140 (FIG. 1) operating offline, may be used as a configuration target 471 (FIG. 4). A storage controller that is offline is a storage controller that is not currently operating and not performing data processing operations. An offline storage controller may be in a quiesce state and not performing I/O operations with respect to one or more host computer systems, one or more primary or secondary storage devices and/or data cache. Alternatively, and in the preferred embodiment, an offline storage controller is an application program running on any computing device (i.e. host, server, PC, etc.) that simulates the configuration of a storage controller (i.e. systems 120, 130, 140). The offline storage controller may have the same configuration interface as any other storage controller's configuration interface. The offline storage controller may operate as an integrated tool that stores configuration images for more than one system or enterprise.

Figure 7:
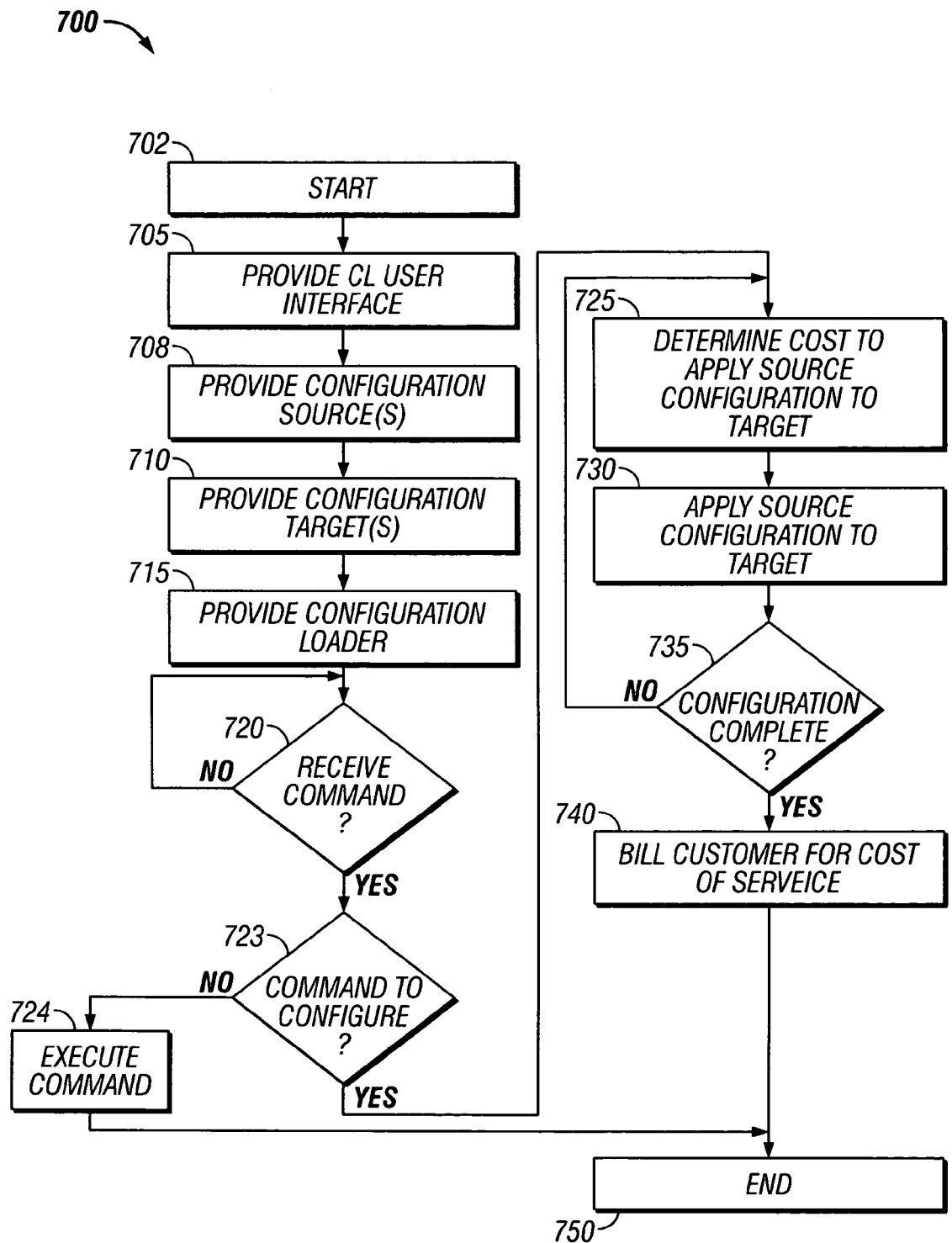
FIG. 7 illustrates a flowchart showing a process to implement an embodiment of the present invention for delivering a service to configure information storage and retrieval systems.

FIG. 7 summarizes certain initial steps of Applicant's invention for delivering a service to configure information storage and retrieval systems. Referring now to FIG. 7, at step 705 the method provides a configuration loader user interface for accepting configuration commands. In the preferred embodiment, the configuration loader user interface provided may be configuration loader interface 305 described above. Configuration commands may comprise, for example, a transfer command to transfer a physical and/or logical configuration from a source to a target information storage and retrieval system. Configuration commands may additionally comprise commands to determine configurations, determine the status of a transfer, cancel a transfer, suspend a transfer, list completed transfers, list suspended transfers, list canceled transfers, list active transfers, list partial configurations, perform partial configuration transfers, resume an already started transfer or any other command needed for transferring configurations. The configuration loader user interface may accept configuration commands from a user, operator, computer system, etc.

At step 708 the method provides at least one information storage and retrieval system configuration source. An information storage and retrieval system configuration source may be a configuration maintained on, for example, any of systems 120 (FIG. 1), 130 (FIG. 1), 140 (FIG. 1). The configurations existing on the source may have been originally setup from a host computer (i.e. host(s) 105) over a network connection (network interface 180). Alternatively, the configuration could have been setup from user interface 160 through the master controller 110 and network interface 180, or combinations thereof. An information storage and retrieval system configuration source also may be a virtual or offline configuration (maintained by OLC processor 320) stored in database 325, or combinations thereof. Each configuration source is capable of communicating with configuration loader 301.

At step 710 the method provides at least one information storage and retrieval system configuration target. An information storage and retrieval system configuration target may comprise, for example, any of systems 120 (FIG. 1), 130 (FIG. 1), 140 (FIG. 1), a virtual or offline configuration (maintained by OLC processor 320) to be stored in database 325, a configuration sent to configuration loader user interface 305 (FIG. 3), a configuration sent to a host computer (i.e. host(s) 105) a configuration sent over a network connection (i.e. network interface 180) or combinations thereof. Each configuration target is capable of communicating with configuration loader 301.

At step 715, the method provides a configuration loader capable of communicating with a configuration loader user interface, with at least one information storage and retrieval system configuration source and with at least one target information storage and retrieval system. The configuration loader comprises a configuration loader module for applying the configuration source to a target information storage and retrieval system. In the preferred embodiment, the configuration loader may be, for example, configuration loader 301 described above. The configuration loader communicates with the configuration loader user interface, with an information storage and retrieval system configuration source and with a target information storage and retrieval system using, for example, network interface server 310 as described above. The configuration loader uses any of network interface clients 460-469 for communication with an information storage and retrieval system configuration source and with a target information storage and retrieval system. The configuration loader module for applying the configuration source to a target information storage and retrieval system may be, for example, configuration loader module 350 described above.

At step 720 the method provides a loop to wait for a configuration command. As described above, configuration commands may additionally comprise commands to determine configurations, determine the status of a transfer, cancel a transfer, suspend a transfer, list completed transfers, or any other command needed for transferring configurations. If a command is received, then control flow to step 723.

At step 723 the method provides a decision to determine if the command received is to configure a target information storage and retrieval system using a configuration source. If the command received is not to configure a target information storage and retrieval system using a configuration source, then control flows to step 724 to execute the command. The command executed at step 724 may comprise commands to determine configurations, determine the status of a transfer, cancel a transfer, suspend a transfer, list completed transfers, or any other command needed for transferring configurations as described above.

If at step 723, the command received is a command to configure a target information storage and retrieval system, then control flows to step 725 where configuration loader module 350 determines a cost to apply the configuration source to the target information storage and retrieval system. Execution of steps 723 and 725 may be accomplished by Applicants' system described above. For example, operative to configuration loader 301 receiving a command from configuration loader user interface 305 to configure a target information storage and retrieval system using a configuration source, configuration loader module 350 determines a cost to apply the configuration source to the target information storage and retrieval system. In the preferred embodiment, a command to configure is received from configuration loader user interface 305, however a command may also be received from other sources, for example, from an information storage and retrieval system (i.e. any of systems 120, 130, 140), OLC processor 320, a host computer (i.e. host(s) 105), a network connection (i.e. network interface 180) or combinations thereof.

The determination of a cost to apply the configuration source to the target information storage and retrieval system at step 725 may be accomplished by, for example, the thread management system 400 shown in FIG. 4 and described above. In the preferred embodiment, step 725 is accomplished by process 800 shown in FIG. 8 and described below. The determination of the cost may comprise many considerations other that the direct factors described below with reference to FIG. 8. For example, the relationship of the customer to the service provider, past history, etc. may be used to enable a discount to specific customers. After execution of step 725, control flows to step 730 to apply the configuration source to the target information storage and retrieval system.

The application of the configuration source to a target information storage and retrieval system at step 730 may be accomplished by, for example, the thread management system 400 shown in FIG. 4 and described above with reference to FIG. 5 and FIG. 6.

After execution of step 730, control flows to step 735 to determine if the configuration is complete and operative to the completion of the application of the configuration source to the target information storage and retrieval system, the configuration loader bills the cost to a customer at step 740. If at step 735 it is determined that the configuration is complete then control transfers to step 740 to send a message to configuration loader user interface 305 that the configuration is complete and to bill the customer. In certain embodiments, completion of the application of the configuration source to the target information storage and retrieval system may comprise a partial configuration of the target as described above with reference to step 530 of FIG. 5. Billing the customer may comprise electronic billing to a customer account, generation of a paper bill or other billing methods known in the art. After execution of step 740 or step 724, the process ends at step 750.

Figure 8:
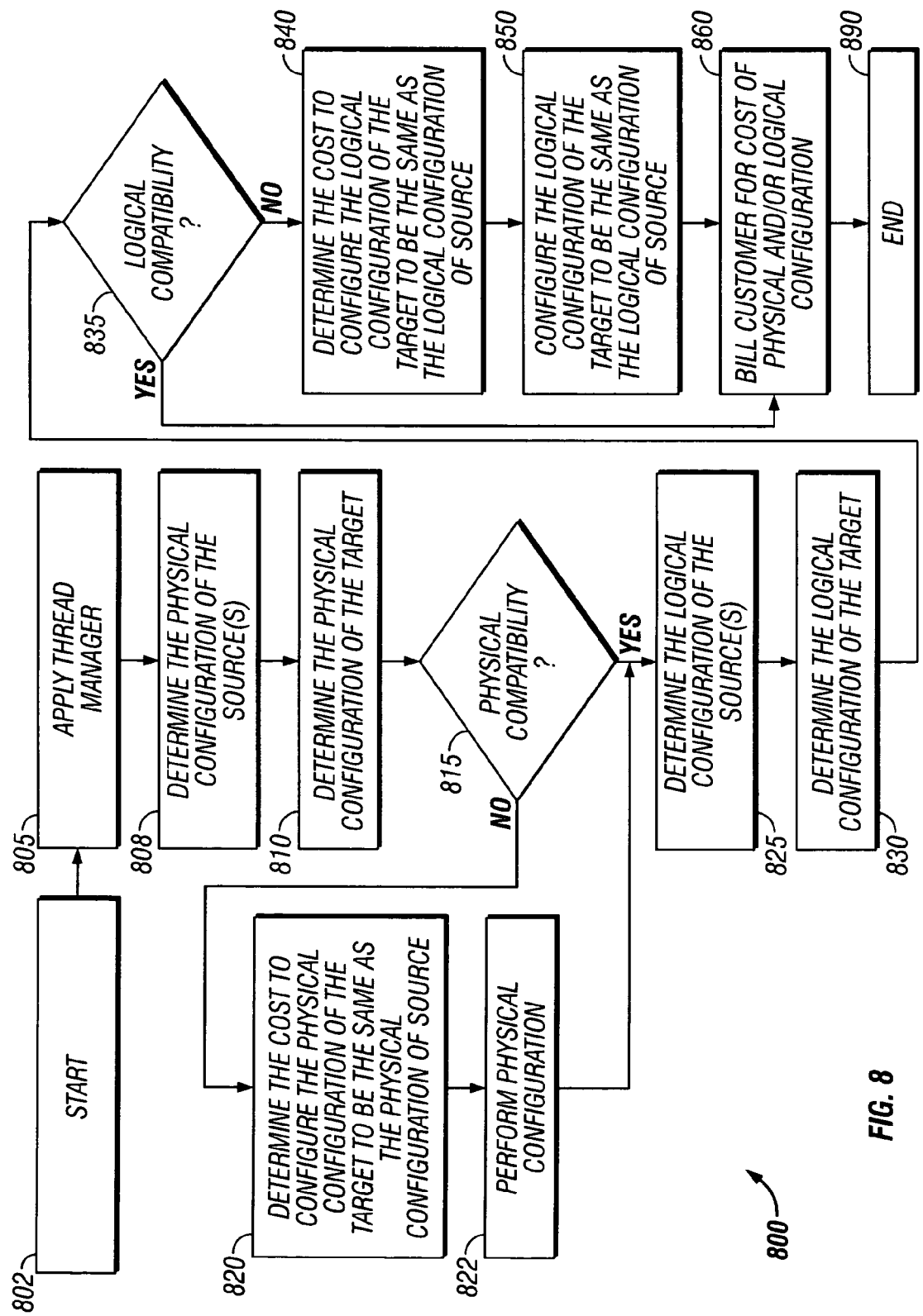
FIG. 8 illustrates a flowchart showing a process to implement an embodiment of the present invention to determine the cost to a customer to configure information storage and retrieval systems.

In the preferred embodiment the execution of certain steps of process 700 may be accomplished by process 800 shown in FIG. 8. Process 800 begins by applying a thread manager, such as, for example, thread manager 360 of thread management system 400 (FIG. 4) described above. Thread manager 360 may or may not be used for managing at least one thread (i.e. threads 365, 366-369), wherein the thread executes the steps (i.e. steps 808-890) necessary to accomplish certain steps of process 700.

As described above with reference to FIG. 4, each transfer thread (i.e. any one of transfer threads 365-369) spawned to execute configuration commands may be a transfer thread instance 450. In the preferred embodiment, transfer thread instance 450 connects a configuration source (i.e. configuration source 470) to a configuration target (i.e. configuration target 471) using, for example, one or more network interface clients 460-469. Once a source and target are connected the configuration may proceed under the direction of, for example, transfer thread instance 450 to execute the necessary commands. In addition to connecting the sources and targets, the threads may also establish a private link/connection to OLC processor 320 and database 325. As described above, database 325 is used to store a task list to accomplish the configuration transfer.

At step 808, the physical configuration of the information storage and retrieval system configuration source is determined. This may be accomplished by configuration loader 301 sending a command to request the physical configuration of a source using a source network interface client (i.e. network interface 460) connection as described above with reference to step 608.

At step 810, the physical configuration of the target information storage and retrieval system configuration is determined. This may be accomplished by configuration loader 301 sending a command to request the physical configuration of a target using a target network interface client (i.e. network interface 461) connection as described above with reference to step 610. After execution of step 810, control flows to step 815 to determine if the source and target are physically compatible.

At step 815, operative to a compatibility between the physical configuration of the information storage and retrieval system configuration source and the physical configuration of the target information storage and retrieval system, steps 825 and 835 are executed to determine the logical configuration of the source and target. The physical compatibility between the source and the target are compared at step 815 and if there is a physical incompatibility then steps 820 and 822 (explained below) are executed. Physical compatibility is explained above with reference to step 615.

Operative to an incompatibility between the physical configuration of the information storage and retrieval system configuration source and the physical configuration of the target information storage and retrieval system, steps 820 and 822 are executed. At step 820, the cost is determined from the difference between the physical configuration of the target information storage and retrieval system and the physical configuration of the information storage and retrieval system configuration source. The cost to the customer is the cost to configure the physical configuration of the target to be the same as the physical configuration of source so that the logical configuration may proceed. The cost to the customer may also include customer requests for configurations, additional configurations discovered while configuring the target or other costs associated with the configuration. At step 822 the physical configuration is performed by configuring of the physical configuration of the target information storage and retrieval system to be the same as the physical configuration of the information storage and retrieval system configuration source. Step 822 may be accomplished by, for example, configuration loader 301 modifying a physical object on the target to be compatible with the source or as described above with reference to step 620. Configuring the physical configuration of the target information storage and retrieval system at Step 822 may be accomplished by a service person. For example, a service person may receive the desired physical configuration from configuration loader user interface 305 and then physically alter the target system to conform to the desired physical configuration. For example, the service person may install or remove components from the target system. A service person may be any person that may configure an information storage system.

Execution of step 815 with a "yes" result or execution of step 822 results in the execution of step 825. At step 825, a determination of the logical configuration of the information storage and retrieval system configuration source is accomplished. After execution of step 825, control transfers to step 830 where a determination of the logical configuration of the target information storage and retrieval system is accomplished. Steps 825 and 830 may be accomplished as explained above with reference to steps 625 and 630.

At step 835, the logical compatibility of the source and target are compared. If the source and target are logically compatible then the process flows to step 860 (explained below) to bill the customer for the physical configuration, if performed. In certain embodiments it may not be necessary to bill the customer and control flows from step 860 to step 890 to end. If at step 835, it is determined that the source and target are not logically compatible then the process flows to step 840. At step 840, the cost is determined from the difference between the logical configuration of the target information storage and retrieval system and the logical configuration of the information storage and retrieval system configuration source. The cost is the cost to the customer to configure the logical configuration of the target to be the same as the logical configuration of source. As explained above, the determination of the cost may comprise many considerations other that the direct factors related to the difference in the logical configurations. For example, the relationship of the customer to the service provider, past history, etc. may be used to enable a discount to specific customers. After execution of step 840, step 850 is executed to configure the logical configuration of the target information storage and retrieval system to be the same as the logical configuration of the information storage and retrieval system configuration source. Step 850 may be accomplished by the process described above with reference to step 640.

Step 860 may be executed either as a result of a "Yes" result from step 835 or after the execution of step 850. At step 860 the customer is billed for the cost of the physical and/or logical configuration. The customer may be billed upon the completion of the application of the configuration source to the target by, for example, configuration loader 301. The customer may be also be billed before the completion of the application of the configuration source to the target, by use of an estimate, flat rate charge etc. Other services may also be billed to the customer at step 860. For example, the cost to analyze the systems to determine configurations may be billed to the customer, even when no actual configurations are performed. The customer may be billed for service time, computer time, network time or any other process associated directly or indirectly with the operation of the present invention. The customer may be billed at a flat service rate, hourly rate, discount rate, or other rate determined by agreement between the service provider and the customer. In certain situations the customer may not be billed for the logical and/or physical configuration. The billing may be provided to the customer electronically, verbally, paper copy, etc. After execution of step 860, control flows to step 890 to end.

In certain embodiments, the operation of the present invention may be accomplished by master controller 110, on a separately network-connected computer system, such as a mainframe, personal computer, workstation, one or more of the information storage and retrieval systems, server and combinations thereof. In still other embodiments, the operation of the present invention may be accomplished by the manufacturer of the master controller, and firmware encoding decisions disposed in a controller, such as processor 112 (FIG. 1).

In certain embodiments, the operation of the present invention may be accomplished by providing a client computer system for operation of configuration loader user interface 305 and billing a customer for providing the computer system for operation of configuration loader user interface 305. Billing a customer for providing the computer system for operation of configuration loader user interface 305 may comprise different billing methods and rates. For example, the billing may be based on usage time, frequency of usage or other factors as are known in the art. The billing may be provided to the customer electronically, verbally, paper copy, etc.

In certain embodiments, the operation of the present invention may be accomplished by providing a server computer system in communication with the client computer system, for operation of configuration loader 301 and billing a customer for providing the computer system for operation of configuration loader 301. The client and/or server computer systems may comprise a host computer, a mainframe computer, personal computer, workstation, and combinations thereof, including an operating system such as Windows, AIX, Unix, MVS, LINUX, etc. The client and/or computer systems may reside or be part of host(s) 105, client(s) 460-469, server 310, storage controller(s) 120-140, or any other computing system connected to or associated with data processing system 100.

In certain embodiments, an online storage controller is used as an information storage and retrieval system configuration source. For example, any of storage controllers 120, 130 and/or 140 (FIG. 1) operating online, may be used as a configuration source 470 (FIG. 4). A storage controller that is online is a storage controller that is currently operating by performing data processing operations. An online storage controller may be performing I/O operations with respect to one or more host computer systems, one or more primary or secondary storage devices and/or data cache. An online storage controller may be provided for the information storage and retrieval system configuration source as a service and the customer may be billed for providing the online storage controller.

In other embodiments, an offline storage controller is used as an information storage and retrieval system configuration source. For example, any of storage controllers 120, 130 and/or 140 (FIG. 1) operating offline, may be used as a configuration source 470 (FIG. 4). A storage controller that is offline is a storage controller that is not currently operating and not performing data processing operations. An offline storage controller may be in a quiesce state and not performing I/O operations with respect to one or more host computer systems, one or more primary or secondary storage devices and/or data cache. Alternatively, and in the preferred embodiment, an offline storage controller is an application program running on any computing device (i.e. host, server, PC, etc.) that simulates the configuration of a storage controller (i.e. systems 120,130,140). The offline storage controller may have the same configuration interface as any other storage controller's configuration interface. The offline storage controller may operate as an integrated tool that stores configuration images for more than one system or enterprise. An offline storage controller may be provided for the information storage and retrieval system configuration source as a service and the customer may be billed for providing the offline storage controller.

In the operation of the present invention, Applicant's master controller receives a request, or a command, or instructions (collectively a "request") to configure a designated second information storage and retrieval system, i.e. a "target" system, with reference to a designated first information storage and retrieval system, i.e. the "source" system. In certain embodiments, the target system comprises an extant system, such as, for example, one or more of systems 120 (FIG. 1), 130 (FIG. 1), and/or 140 (FIG. 1). In other embodiments, the target system comprises a virtual configuration image. In certain of these virtual system embodiments, the target system will be used as a simulation tool to assist the optimization of extant systems.

In certain embodiments, Applicant's invention includes a data storage system comprising a configuration loader user interface for accepting configuration commands (i.e. configuration loader user interface 305), a first information storage and retrieval system (i.e. systems 120, 130, and/or 140), a second information storage and retrieval system (i.e. systems 120, 130, and/or 140); and a configuration loader (i.e. configuration loader 301). The configuration loader is capable of communicating with the configuration loader user interface, with the first information storage and retrieval system and with the second information storage and retrieval system. The configuration loader may comprise a configuration loader module (i.e. configuration loader module 350) for applying the configuration from the first information storage and retrieval system to the second information storage and retrieval system. In certain embodiments the configuration loader is adapted to execute steps so that operative to the configuration loader receiving a command from the configuration loader user interface to configure the second information storage and retrieval system using the configuration from the first information storage and retrieval system, the configuration loader module applies the configuration from the first information storage and retrieval system to the second information storage and retrieval system.

In certain embodiments, Applicant's invention includes instructions, where those instructions are executed by processor 112 (FIG. 1) to perform steps recited in the flowcharts shown in FIGS. 5-8.

In other embodiments, Applicant's invention includes instructions residing in any other computer program product, where those instructions are executed by a computer external to, or internal to, master controller 110. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

The foregoing description, for purposes of explanation, used specific nomenclature to provide a thorough understanding of the present invention. However, it will be apparent to one skilled in the art that the specific details are not required in order to practice the present invention. In other instances, well known circuits and devices are shown in block diagram form in order to avoid unnecessary distraction from the present invention. Thus, the foregoing descriptions of specific embodiments of the present invention are presented for purposes of illustration and description. They are not intended to be exhaustive or to limit the present invention to the precise forms disclosed. Obviously many modifications and variations are possible in view of the above teachings.

The present invention disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, MRAMs, MEMS based memory, microcode, programmable logic, etc.). Code in the computer readable medium is accessed and executed by one or more processors. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic of FIGS. 5-8 describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The logic of FIGS. 5-8 was described as being implemented in software. This logic may be part of the operating system of the host systems or an application program. In yet further implementations, this logic may be maintained in storage areas managed by the control units or in a read only memory or other hardwired type of device. The preferred logic may be implemented in hard disk drives or in programmable and non-programmable gate array logic.

The embodiments were chosen and described in order to best explain the principles of the present invention and its practical applications, to thereby enable others skilled in the art to best utilize the present invention and various embodiments with various modifications as are suited to the particular use contemplated. It is intended that the scope of the present invention be defined by the following claims and their equivalents.

What is claimed is:

1. A method to configure information storage and retrieval systems, comprising:

providing a configuration loader user interface for accepting configuration commands; and providing a configuration loader capable of communicating with said configuration loader user interface, and with a source storage and retrieval system and with a target information storage and retrieval system, said configuration loader comprising a configuration loader module for applying said source data storage and retrieval system logical configuration to said target information storage and retrieval system:

receiving a command from said configuration loader user interface to configure said target information storage and retrieval system using said source storage and retrieval system;

determining a physical configuration of said source information storage and retrieval system;

determining a physical configuration of said target information storage and retrieval system;

determining for each physical object disposed in said source information storage and retrieval system if a corresponding physical object is disposed in said target information storage and retrieval system;

operative if for each physical object disposed in said source information storage and retrieval system if a corresponding physical object is disposed in said target information storage and retrieval system;

determining a logical configuration of said source information storage and retrieval system;

determining a logical configuration of said target information storage and retrieval system;

operative if the logical configuration of said source information storage and retrieval system is not the same as the logical configuration of said target information storage and retrieval system, configuring the logical configuration of the target information storage and retrieval system to be the same as the logical configuration of the source information storage and retrieval system.

2. The method of claim 1, further comprising the steps of:
providing said source information storage and retrieval system configuration source; and
providing said target information storage and retrieval system.

3. The method of claim 1, wherein said step of providing a configuration loader further comprises:
operative to a completion of said application of said source information storage and retrieval logical configuration to said target information storage and retrieval system, said configuration loader communicating to said configuration loader user interface said completion of said application of said source information storage and retrieval logical configuration to said target information storage and retrieval system.

4. The method of claim 1, wherein said step of said configuration loader module applying said source information storage and retrieval logical configuration to said target information storage and retrieval system further comprises the steps of:
applying a thread manager for managing thread, wherein said at least one thread executes said determining steps and said configuring step.

5. The method of claim 4, further comprising:
operative to an incompatibility between said physical configuration of said source information storage and retrieval system and said physical configuration of said target information storage and retrieval system:
configuring said physical configuration of said target information storage and retrieval system to be the same as said physical configuration of said source information storage and retrieval system;
determining a logical configuration of said source information storage and retrieval system;
determining a logical configuration of said target information storage and retrieval system; and
configuring said logical configuration of said target information storage and retrieval system to be the same as said logical configuration of said source information storage and retrieval system.

6. The method of claim 1, further comprising:
providing a client computer system for operation of said configuration loader user interface; and
providing a server computer system in communication with said client computer system, for operation of said configuration loader.

7. The method of claim 1, further comprising:
using an online storage controller as said source information storage and retrieval system.

8. The method of claim 1, further comprising:
using an offline storage controller as said source information storage and retrieval system.

9. The method of claim 1, further comprising:
using an online storage controller as said target information storage and retrieval system.

10. The method of claim 1, further comprising:
using an offline storage controller as said target information storage and retrieval system.

11. The method of claim 1, wherein said step of said configuration loader module applying said source information storage and retrieval system logical configuration to said target information storage and retrieval system comprises a partial configuration of said target information storage and retrieval system.

12. The method of claim 1, wherein said step of said configuration loader module applying said source information storage and retrieval system logical configuration to said target information storage and retrieval system further comprises the steps of:
executing a task list of configuration actions, wherein said task list is persistently maintained in an offline configuration database.

13. The method of claim 1, wherein said step of providing a configuration loader further comprises:
operative to a completion of said application of said source information storage and retrieval system logical configuration to said target information storage and retrieval system, said configuration loader communicating the status of one or more configuration transfers to said configuration loader user interface.

14. A system to configure information storage and retrieval systems, comprising:
a configuration loader user interface for accepting configuration commands;
source information storage and retrieval system;
a target information storage and retrieval system; and
a configuration loader capable of communicating with said configuration loader user interface, with said source information storage and retrieval system and with said target information storage and retrieval system, said configuration loader comprising a configuration loader module for applying said source information storage and retrieval system logical configuration to said target information storage and retrieval system, wherein said configuration loader executes steps comprising:
determining a physical configuration of said source information storage and retrieval system;
determining a physical configuration of said target information storage and retrieval system;
determining for each physical object disposed in said source information storage and retrieval system if a corresponding physical object is disposed in said target information storage and retrieval system;
operative if for each physical object disposed in said source information storage and retrieval system if a corresponding physical object is disposed in said target information storage and retrieval system;

determining a logical configuration of said source information storage and retrieval system;

determining a logical configuration of said target information storage and retrieval system;

operative if the logical configuration of said source information storage and retrieval system is not the same as the logical configuration of said target information storage and retrieval system, configuring the logical configuration of the target information storage and retrieval system to be the same as the logical configuration of the source information storage and retrieval system.

15. The system of claim 14, where said configuration loader is adapted to execute steps further comprising: operative to a completion of said application of said source information storage and retrieval system logical configuration to said target information storage and retrieval system, said configuration loader communicating to said configuration loader user interface said completion of said application of said source information storage and retrieval system logical configuration to said target information storage and retrieval system.

16. The system of claim 14, further comprising a thread manager for managing at least one thread, wherein said step of said configuration loader module a in said source information storage and retrieval system logical configuration to said information storage and retrieval system is accomplished by said at least one thread performs said determining steps and said configuring step.

17. The system of claim 16, wherein said at least one thread executes the further steps of:

operative to an incompatibility between said physical configuration of said source information storage and retrieval system and said physical configuration of said target information storage and retrieval system:

configuring said physical configuration of said target information storage and retrieval system to be the same as said physical configuration of said source information storage and retrieval system;

determining a logical configuration of said source information storage and retrieval system;

determining a logical configuration of said target information storage and retrieval system; and configuring said logical configuration of said target information storage and retrieval system to be the same as said logical configuration of said source information storage and retrieval system.

18. The system of claim 14, further comprising:

a client computer system for operation of said configuration loader user interface; and a server computer system in communication with said client computer system for operation of said configuration loader.

19. The system of claim 14, further comprising:

an online storage controller for use as said source information storage and retrieval system.

20. The system of claim 14, further comprising:

an offline storage controller for use as said source information storage and retrieval system.

21. The system of claim 14, further comprising:

an online storage controller for use as said target information storage and retrieval system.

22. The system of claim 14, further comprising:

an offline storage controller for use as said target information storage and retrieval system.

23. The system of claim 14, wherein said step of said configuration loader module applying said source data storage and retrieval system logical configuration to said target information storage and retrieval system comprises a partial configuration of said target information storage and retrieval system.

24. The system of claim 14, further comprising an offline configuration database and wherein said step of said configuration loader module applying said source data storage and retrieval system logical configuration to said target information storage and retrieval system further comprises the step of:

executing a task list of configuration actions, wherein said task list in is persistently maintained in said offline configuration database.

25. The system of claim 14, wherein said configuration loader further adapted to execute the step of:

operative to a completion of said application of said source data storage and retrieval system logical configuration to said target information storage and retrieval system, said configuration loader communicating the status of one or more configuration transfers to said configuration loader user interface.

26. An article of manufacture comprising a data storage medium tangibly embodying a program of machine-readable instructions executable by a system to configure information storage and retrieval systems, said system comprising:

a configuration loader user interface for accepting configuration commands;

source information storage and retrieval system;

target information storage and retrieval system; and a configuration loader capable of communicating with said configuration loader user interface, with said source information storage and retrieval system and with said target information storage and retrieval system, said configuration loader comprising a configuration loader module for applying said source data storage and retrieval system logical configuration to said target information storage and retrieval system, where said program of machine-readable instructions causes:

receiving a command from said configuration loader user interface to configure said target information storage and retneval system using said source storage and retrieval system;

determining a physical configuration of said source information storage and retneval system;

determining a physical configuration of said target information storage and retrieval system;

determining for each physical object disposed in said source information storage and retrieval system if a corresponding physical object is disposed in said target information storage and retrieval system;

operative if for each physical object disposed in said source information storage and retrieval system if a corresponding physical object is disposed in said target information storage and retrieval system;

determining a logical configuration of said source information storage and retrieval system;

determining a logical configuration of said target information storage and retrieval system;

operative if the logical configuration of said source information storage and retrieval system is not the same as the logical configuration of said target information storage and retrieval system, configuring the logical configuration of the target information storage and retrieval system to be the same as the logical configuration of the source information storage and retrieval system.

27. The article of manufacture of claim 26 where said program of machine-readable instructions further causes:

operative to a completion of said application of said source data storage and retrieval system logical configuration to said target information storage and retrieval system, said configuration loader communicating to said configuration loader user interface said completion of said application of said source data storage and retrieval system logical configuration to said target information storage and retrieval system.

28. The article of manufacture of claim 26, wherein said system further comprises a thread manager for managing thread, wherein said step of said configuration loader module applying said source data storage and retrieval system logical configuration to said target information storage and retrieval system is accomplished by said program of machine-readable instructions causing said thread to perform said determining steps and said configuring step.

29. The article of manufacture of claim 28, where said program of machine-readable instructions further causes said at least one thread to:
  operative to an incompatibility between said physical configuration of said source information storage and retrieval system and said physical configuration of said target information storage and retrieval system:
  configure said physical configuration of said target information storage and retrieval system to be the same as said physical configuration of said source information storage and retrieval system;
  determine a logical configuration of said source information storage and retrieval system;
  determine a logical configuration of said target information storage and retrieval system; and
  configure said logical configuration of said target information storage and retrieval system to be the same as said logical configuration of said source information storage and retrieval system.

30. The article of manufacture of claim 26, where said program of machine-readable instructions further causes a partial configuration of said target information storage and retrieval system.

31. The article of manufacture of claim 26, where said program of machine-readable instructions further causes the execution of a task list of configuration actions.

32. The article of manufacture of claim 26, where said program of machine-readable instructions further causes:
  operative to a completion of said application of said source data storage and retrieval system logical configuration to said target information storage and retrieval system, said configuration loader communicating the status of one or more configuration transfers to said configuration loader user interface.

33. A configuration loader capable of communicating with a configuration loader user interface, with source information storage and retrieval system and with target information storage and retrieval system, said configuration loader comprising a configuration loader module for applying said source data storage and retrieval system logical configuration to said target information storage and retrieval system, wherein said configuration loader executes the steps comprising:
  determining a physical configuration of said source information storage and retrieval system;
  determining a physical configuration of said target information storage and retrieval system;
  determining for each physical object disposed in said source information storage and retrieval system if a corresponding physical object is disposed in said target information storage and retrieval system;
  operative if for each physical object disposed in said source information storage and retrieval system if a corresponding physical object is disposed in said target information storage and retrieval system:
  determining a logical configuration of said source information storage and retrieval system;
  determining a logical configuration of said target information storage and retrieval system;
  operative if the logical configuration of said source information storage and retrieval system is not the same as the logical configuration of said target information storage and retrieval system, configuring the logical configuration of the target information storage and retrieval system to be the same as the logical configuration of the source information storage and retrieval system.

34. The configuration loader of claim 33, further comprising a thread manager for managing at least one thread, wherein said step of said configuration loader module applying said source data storage and retrieval system logical configuration to said target information storage and retrieval system is accomplished by said thread executing said determining steps and said configuring step.

35. A method for delivering a service to configure information storage and retrieval systems, comprising:
  providing a configuration loader user interface for accepting configuration commands; providing a configuration loader capable of communicating with said configuration loader user interface, a source information storage and retrieval system and with target information storage and retrieval system, said configuration loader comprising a configuration loader module for applying said source data storage and retrieval system logical configuration to said target information storage and retrieval system:
  operative to said configuration loader receiving a command from said configuration loader user interface to configure said at-least-ene target information storage and retrieval system using said source information storage and retrieval system;
  determining a physical configuration of said source information storage and retrieval system;
  determining a physical configuration of said target information storage and retrieval system;
  determining for each physical object disposed in said source information storage and retrieval system if a corresponding physical object is disposed in said target information storage and retrieval system;
  operative if for each physical object disposed in said source information storage and retrieval system if a corresponding physical object is disposed in said target information storage and retrieval system:
  determining a logical configuration of said source information storage and retrieval system;
  determining a logical configuration of said target information storage and retrieval system;
  operative if the logical configuration of said source information storage and retrieval system is not the same as the logical configuration of said target information storage and retrieval system, configuring the logical configuration of the target information storage and retrieval system to be the same as the logical configuration of the source information storage and retrieval system;
  said configuration loader module determining a cost to apply said source data storage and retrieval system logical configuration to said target information storage and retrieval system.

36. The method of claim 35, further comprising the steps of:
  operative to a completion of said application of said source information storage and retrieval system to said target information storage and retrieval system, said configuration loader billing said cost to a customer.

37. The method of claim 35, wherein said step of said configuration loader module determining a cost to apply said source data storage and retrieval system logical configuration to said target information storage and retrieval system further comprises the steps of:
  determining said cost from a difference between said logical configuration of said target information storage and retrieval system and said logical configuration of said source information storage and retrieval system.

38. The method of claim 35, wherein said step of said configuration loader module determining a cost to apply said source data storage and retrieval system logical configuration to said target information storage and retrieval system further comprises the steps of:
  determining a physical configuration of said source information storage and retrieval system;
  determining a physical configuration of said target information storage and retrieval system; and
  operative to an incompatibility between said physical configuration of said source information storage and retrieval system information storage and retrieval system and said physical configuration of said target information storage and retrieval system:
  determining said cost from a difference between said physical configuration of said target information storage and retrieval system and said physical configuration of said source information storage and retrieval system.

39. The method of claim 38, further comprising:
  configuring said physical configuration of said target information storage and retrieval system to be the same as said physical configuration of said source information storage and retrieval system; and
  billing a customer for said configuring said physical configuration of said target information storage and retrieval system.

40. The method of claim 39, wherein said configuring said physical configuration of said target information storage and retrieval system is accomplished by at least one service person.

41. The method of claim 35, further comprising:
  providing a computer system for operation of said configuration loader user interface; and
  billing a customer for providing said computer system for operation of said configuration loader user interface.

42. The method of claim 35, further comprising:
  providing a computer system for operation of said configuration loader; and
  billing a customer for providing said computer system for operation of said configuration loader.

43. The method of claim 35, further comprising:
  providing an online storage controller as said source information storage and retrieval system; and
  billing a customer for providing said online storage controller.

44. The method of claim 35, further comprising:
  providing an offline storage controller as said source information storage and retrieval system; and
  billing a customer for providing said offline storage controller.

45. A data storage system, comprising:
  a configuration loader user interface for accepting configuration commands;
  a first information storage and retrieval system;
  a second information storage and retrieval system; and
  a configuration loader capable of communicating with said configuration loader user interface, with said first information storage and retrieval system and with said second information storage and retrieval system, said configuration loader comprising a configuration loader module for applying a configuration from said first information storage and retrieval system to said second information storage and retrieval system;
  where said configuration loader is adapted to execute steps comprising:
  determining a physical configuration of said source information storage and retrieval system;
  determining a physical configuration of said target information storage and retrieval system;
  determining for each physical object disposed in said source information storage and retrieval system if a corresponding physical object is disposed in said target information storage and retrieval system;
  operative if for each physical object disposed in said source information storage and retrieval system if a corresponding physical object is disposed in said target information storage and retrieval system:
  determining a logical configuration of said source information storage and retrieval system;
  determining a logical configuration of said target information storage and retrieval system;
  operative if the logical configuration of said source information storage and retrieval system is not the same as the logical configuration of said target information storage and retrieval system, configuring the logical configuration of the target information storage and retrieval system to be the same as the logical configuration of the source information storage and retrieval system.

* * * * *